United States Patent [19]

Huang

[11] Patent Number: 5,416,849
[45] Date of Patent: May 16, 1995

[54] DATA PROCESSING SYSTEM AND METHOD FOR FIELD EXTRACTION OF SCANNED IMAGES OF DOCUMENT FORMS

[75] Inventor: Shiow-Laang Huang, Herndon, Va.

[73] Assignee: International Business Machine Corporation, Armonk, N.Y.

[21] Appl. No.: 964,225

[22] Filed: Oct. 21, 1992

[51] Int. Cl.$^6$ ............................................. G06K 9/00
[52] U.S. Cl. .................................... 382/173; 382/317; 395/146
[58] Field of Search ................... 382/9, 61, 22, 44, 41; 395/100, 144, 145, 146

[56] References Cited

U.S. PATENT DOCUMENTS

| | | | |
|---|---|---|---|
| 4,020,462 | 4/1977 | Morrin, Jr. | 382/23 |
| 4,741,045 | 4/1988 | Denning | 382/9 |
| 4,813,077 | 3/1989 | Woods et al. | 382/61 |
| 4,949,392 | 8/1990 | Barski et al. | 382/61 |
| 5,010,580 | 4/1991 | Vincent et al. | 382/61 |
| 5,025,484 | 6/1991 | Yamanari et al. | 382/61 |
| 5,050,222 | 9/1991 | Lee | 382/22 |
| 5,093,873 | 3/1992 | Takahashi | 382/9 |
| 5,123,062 | 6/1992 | Sangu | 382/9 |
| 5,140,650 | 8/1992 | Casey et al. | 382/61 |
| 5,199,081 | 3/1992 | Saito et al. | 382/9 |
| 5,229,589 | 7/1993 | Schneider | 382/61 |

FOREIGN PATENT DOCUMENTS 2000012  8/1990  Canada.

Primary Examiner—Joseph Mancuso
Attorney, Agent, or Firm—John Hoel; David A. Mims, Jr.

[57] ABSTRACT

An improved data processing system and method are disclosed for field extraction of scanned images of document forms. The process makes use of a viewpoint structure which characterizes the interior and surrounding regions of a field from which an image is to be extracted for character recognition.

2 Claims, 24 Drawing Sheets

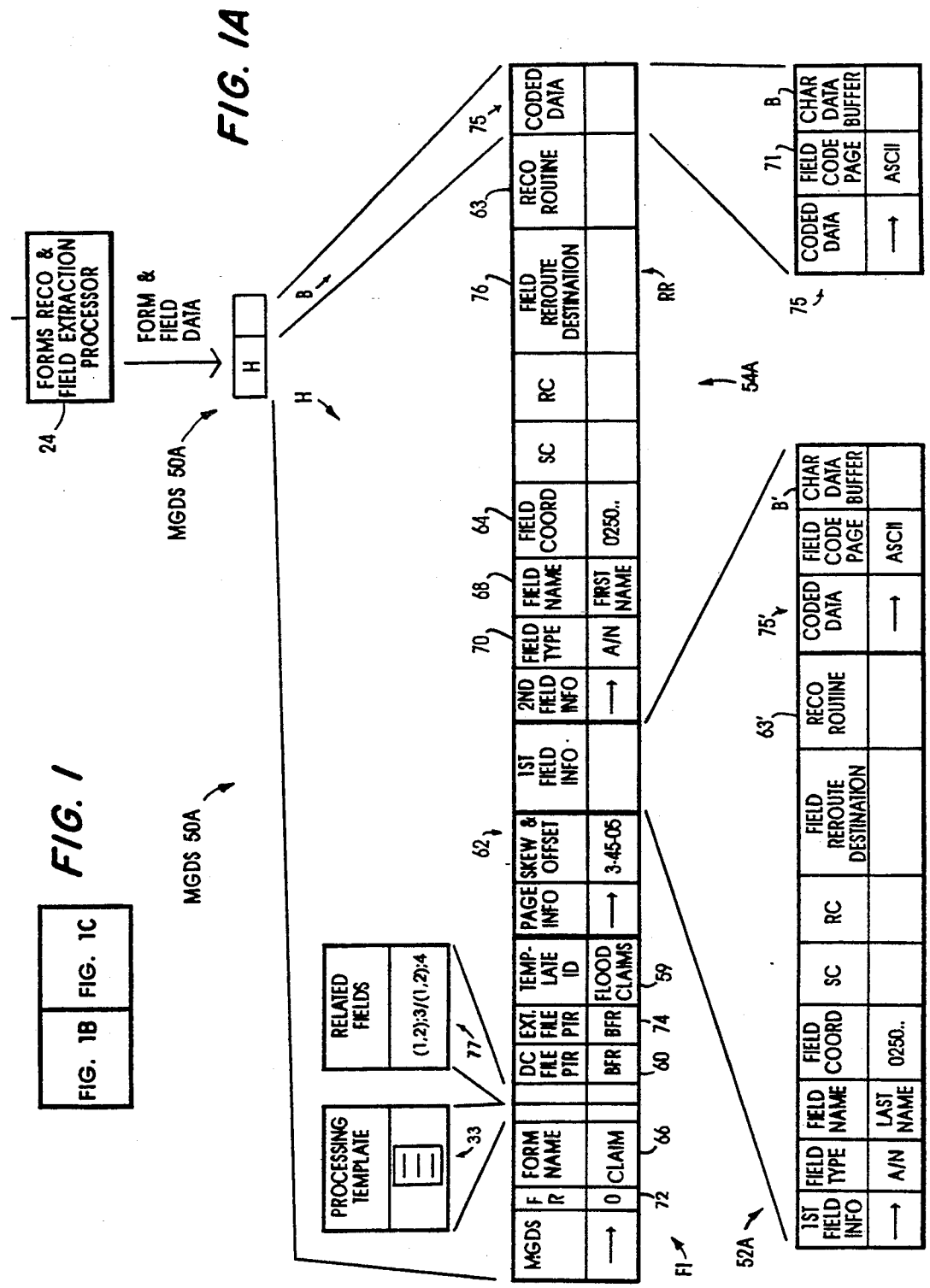

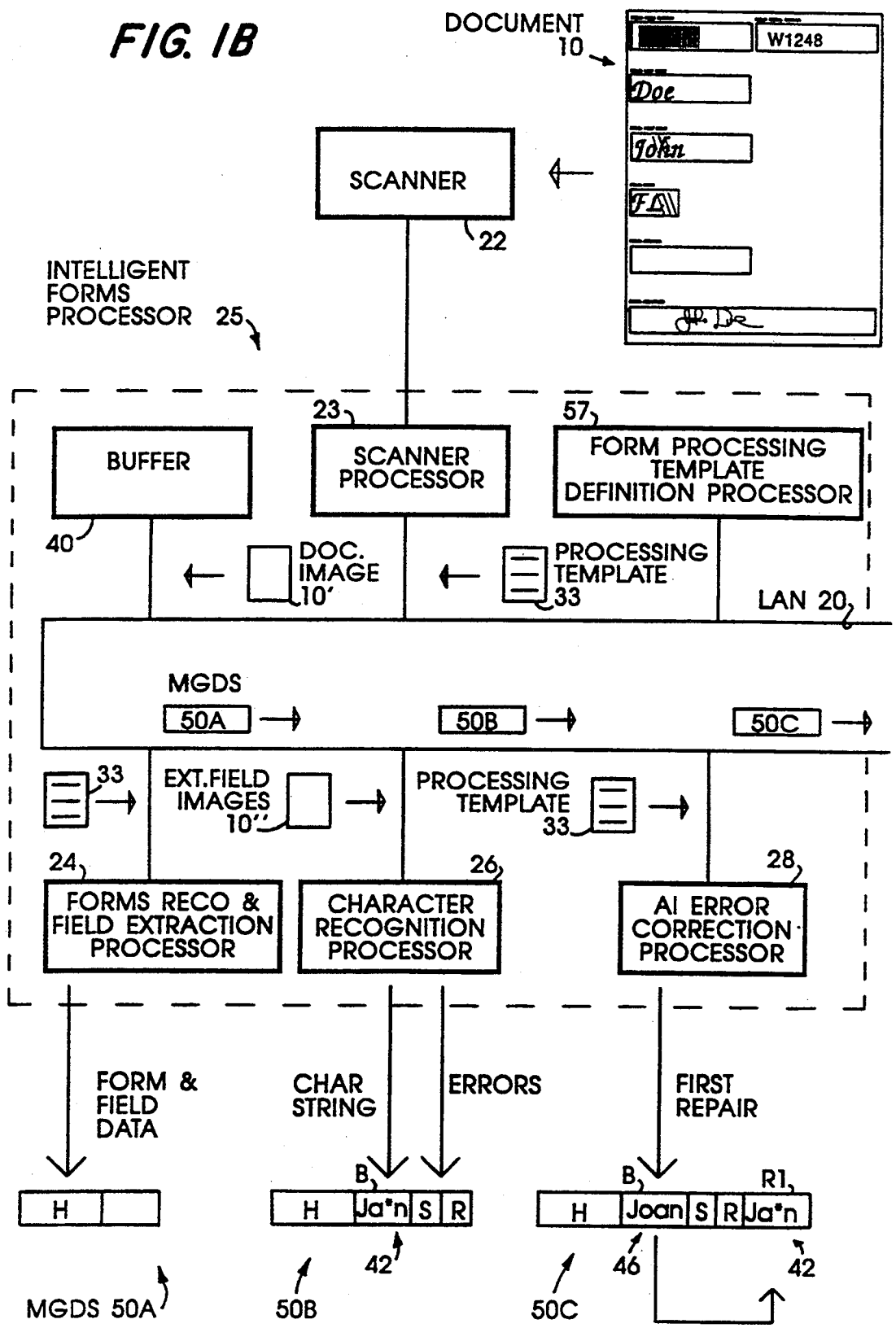

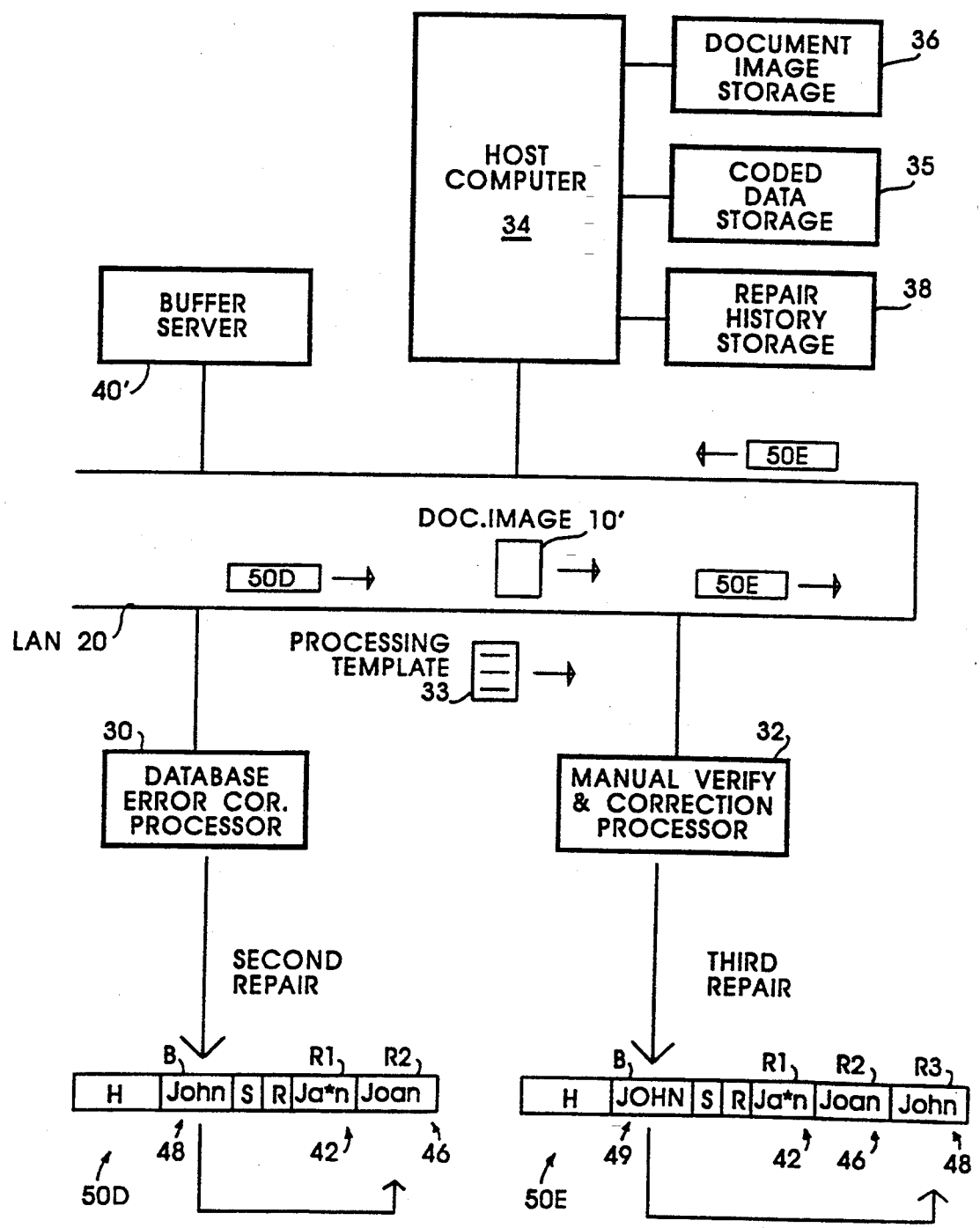

FIG. 2A

MASTER FORM 10F

FIELD: FORM NUMBER

11F

FIELD: SERIAL NUMBER

12F

FIELD: LAST NAME

14F

13

Insurance
Claim Form

FIELD: FIRST NAME

16F

17

FIELD: STATE

12aF

FIELD: ADDRESS

12bF

FIELD: SIGNATURE

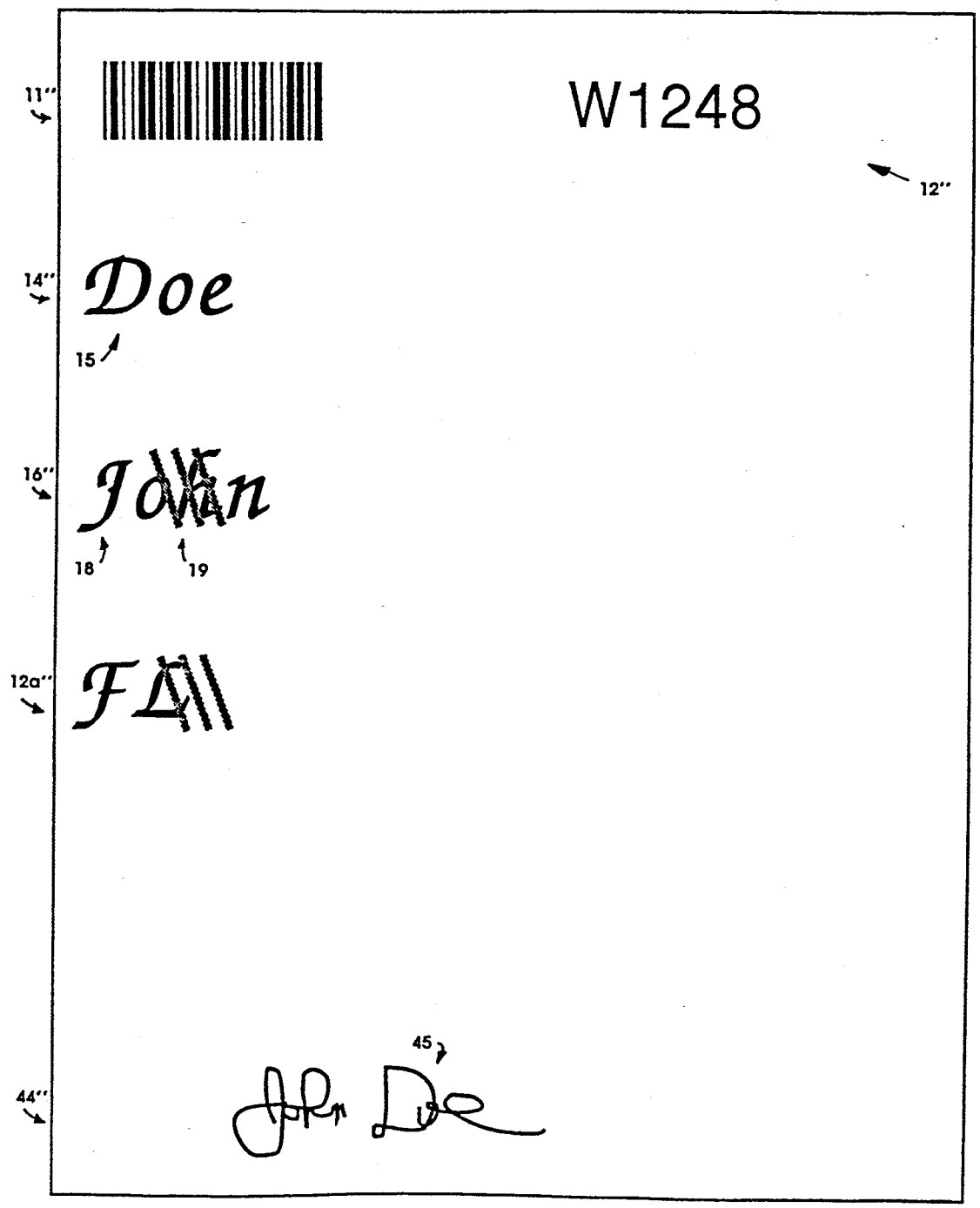

FIG. 4

```
Processing Template 33
    Header Portion 78
      Template Name: "FLOOD CLAIMS"
      Form Name: "INSURANCE CLAIM FORM"
      Number of Fields: 6
      Option for "SKIP_IF_REDUNDANT" step for all fields:  NOT SELECTED
      Option for "CROSS_CHECK" of all related fields: NOT SELECTED
    Field Processing Definition Portion 80
      First Field
      Second Field
      Third Field
      Fourth Field
      Fifth Field
      Sixth Field
    Form Definition Data Set 400
    Form Recognition Information 402
    Field Extraction Information 404
            First Field 405
                  Coordinates 406
                  View Point Stucture 408
            Second Field 405'
                  Coordinates 406'
                  View Point Stucture 408'
                :
            Last Field
                  Coordinates
                  View Point Stucture
```

FIG. 7A

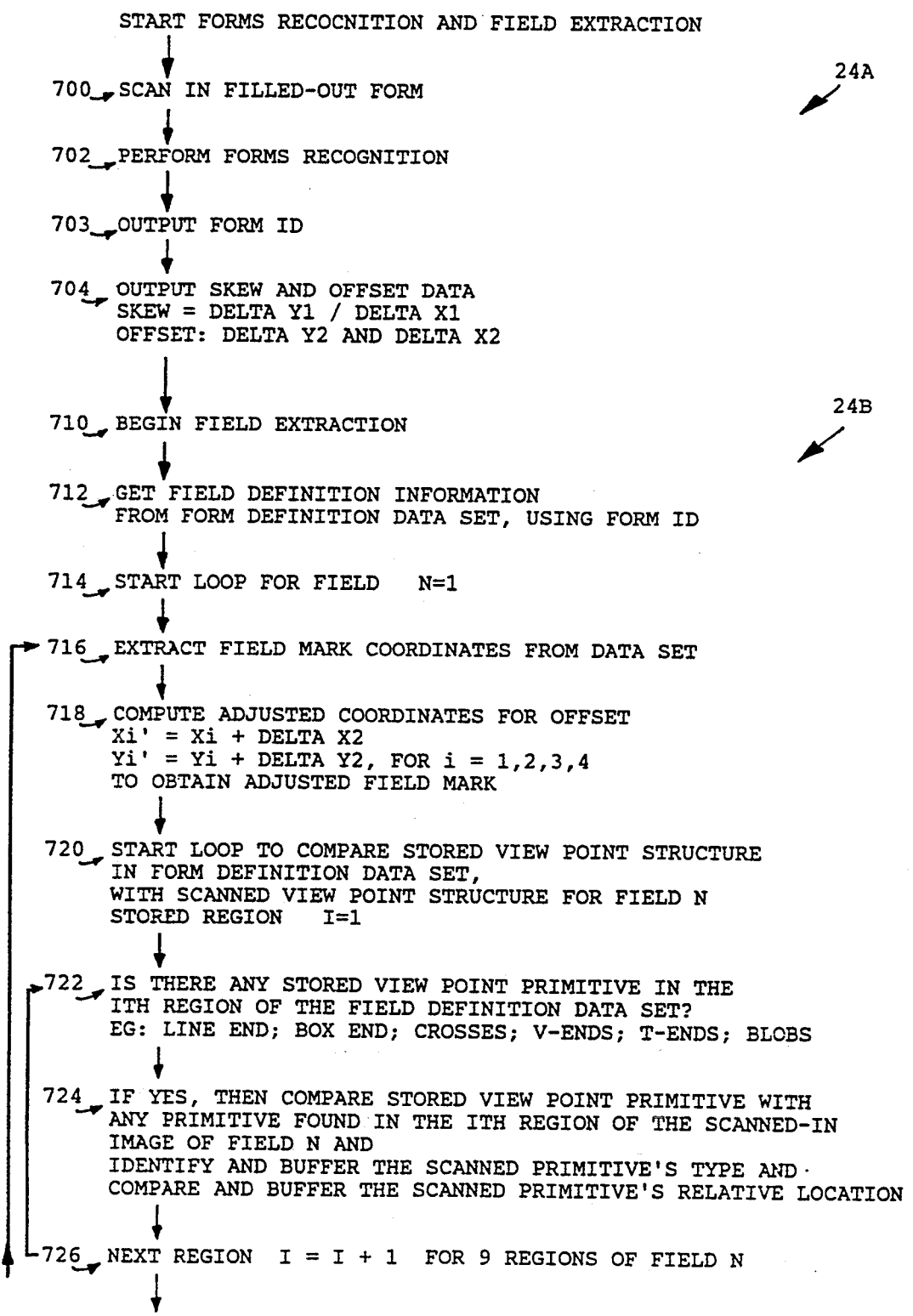

START FORMS RECOGNITION AND FIELD EXTRACTION

700 — SCAN IN FILLED-OUT FORM

702 — PERFORM FORMS RECOGNITION

703 — OUTPUT FORM ID

704 — OUTPUT SKEW AND OFFSET DATA
SKEW = DELTA Y1 / DELTA X1
OFFSET: DELTA Y2 AND DELTA X2

710 — BEGIN FIELD EXTRACTION

712 — GET FIELD DEFINITION INFORMATION
FROM FORM DEFINITION DATA SET, USING FORM ID

714 — START LOOP FOR FIELD   N=1

716 — EXTRACT FIELD MARK COORDINATES FROM DATA SET

718 — COMPUTE ADJUSTED COORDINATES FOR OFFSET
Xi' = Xi + DELTA X2
Yi' = Yi + DELTA Y2, FOR i = 1,2,3,4
TO OBTAIN ADJUSTED FIELD MARK

720 — START LOOP TO COMPARE STORED VIEW POINT STRUCTURE
IN FORM DEFINITION DATA SET,
WITH SCANNED VIEW POINT STRUCTURE FOR FIELD N
STORED REGION   I=1

722 — IS THERE ANY STORED VIEW POINT PRIMITIVE IN THE
ITH REGION OF THE FIELD DEFINITION DATA SET?
EG: LINE END; BOX END; CROSSES; V-ENDS; T-ENDS; BLOBS

724 — IF YES, THEN COMPARE STORED VIEW POINT PRIMITIVE WITH
ANY PRIMITIVE FOUND IN THE ITH REGION OF THE SCANNED-IN
IMAGE OF FIELD N AND
IDENTIFY AND BUFFER THE SCANNED PRIMITIVE'S TYPE AND ·
COMPARE AND BUFFER THE SCANNED PRIMITIVE'S RELATIVE LOCATION

726 — NEXT REGION   I = I + 1   FOR 9 REGIONS OF FIELD N

FIG. 7B

728 — REMOVE FROM THE SCANNED IMAGE OF THE FIELD, THOSE VIEW POINT PRIMITIVES THAT MATCH THE STORED VIEW POINT PRIMITIVES IN THE FORM DEFINITION DATA SET

730 — PERFORM PARTIAL REMOVAL FROM THE SCANNED IMAGE OF THE FIELD ANY 'STRANGE VIEWPOINTS'

732 — FINE TUNE THE SCANNED IN IMAGE OF THE FIELD FOR AMBIGUOUS PIXELS, RETAINING ANY AMBIGUOUS PIXELS

734 — CHECK FOR LONG LINE SEGMENTS IN THE SCANNED IN IMAGE OF THE FIELD AND REMOVE ANY FOUND

736 — CHECK FOR JAGGED, CONNECTED LINES IN THE SCANNED IN IMAGE OF THE FIELD AND REMOVE ANY FOUND

738 — CHECK FOR ISOLATED PIXELS IN THE SCANNED IN IMAGE OF THE FIELD AND USE SKEW DATA AND THE DISTANCE OF THE ISOLATED PIXEL FROM THE ADJUSTED FIELD MARK, TO DETERMINE THE VALIDITY OF THE PIXEL AND KEEP VALID ISOLATED PIXELS

740 — EXTRACT THE REMAINDER OF THE SCANNED IN IMAGE OF THE FIELD AND BUFFER

742 — NEXT FIELD N = N + 1

744 — OUTPUT EXTRACTED FIELDS TO CHARACTER RECOGNITION PROCESS

746 — OUTPUT COORDINATES OF ADJUSTED FIELD MARKS TO MGDS.

FEATURES:
1. delimiter options: '-', ',', or others
2. delimiter removal

FIG. 17
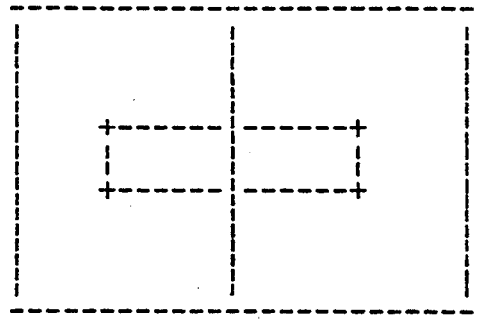
```
                        | this line is long enough to be
                        V a line and should be erased.
      +---------------------+
      |         |           |
      |   +-----|-----+     |
      |   |     |     |     |
      |   +-----|-----+     |
      |         |           |
      +---------------------+
```
FIG. 18
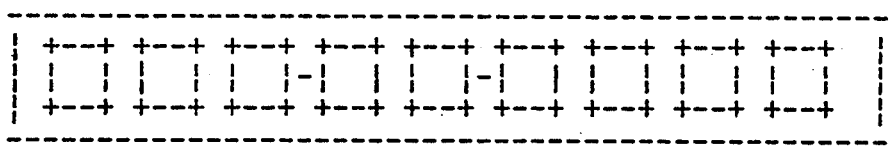
FIG. 19
```
+-------------------------------------------------+
| NAME:                                           |
|                                                 |
|                                                 |
+-------------------------------------------------+
```
FIG. 20
```
+-----------------------+      +-----------------+
| PHONE: (....)___-___  |      | DATE: __/__/__  |
+-----------------------+      +-----------------+
+-----------------------+     <--- There is requirement to
|                       |          keep the '$' ':' and '.'
| $: _____.___    |          in order to allow the
+-----------------------+          OCR result to be meaningful.
```

*FIG. 24*
```
+---+---+---+
|0 1|0 1|0 1|
| A | B | C |
|3 2|3 2|3 2|
+---+---+---+
|0 1|0 1|0 1|
| D | E | F |
|3 2|3 2|3 2|
+---+---+---+
|0 1|0 1|0 1|
| G | H | I |
|3 2|3 2|3 2|
+---+---+---+
```
*FIG. 25*
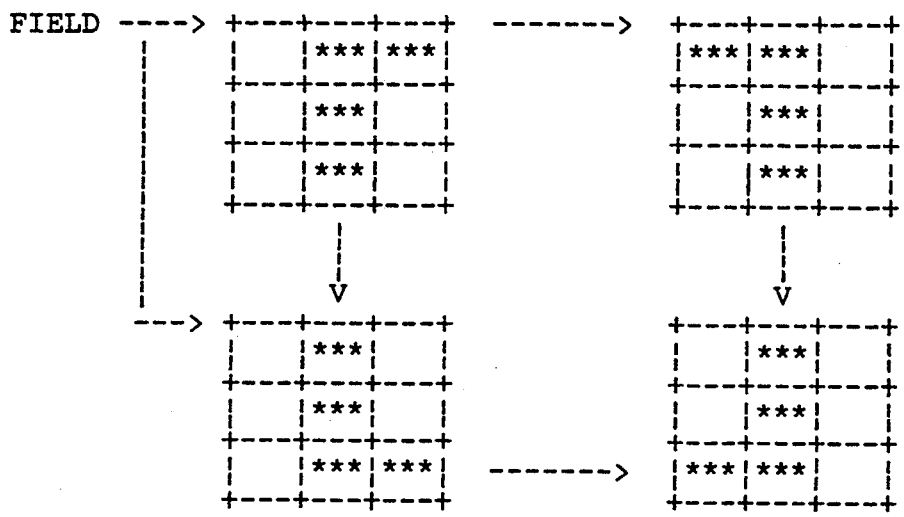
*FIG. 26A*
LINEAR: every viewpoint connects at most 2 other viewpoints.
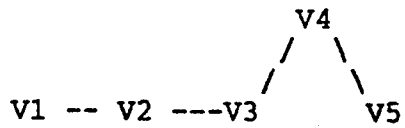
*FIG. 26B*
NOT LINEAR:    V1 -- V2 ---V3
                     |
                     V4
NOTE: if the line between V2 and V4 are not longer
   the the MIN_LINE_SEGMENT, it is pseudo linear.
** this MIN_LINE_SEGMENT can be defined as
   at least 3 times of the cell width of V.

( note:  . OFF
        * ON )

LINES:

a.  ...   b.  *..   c.  .*.   d.  ..*
    ...       .*.       .*.       .*.
    ...       ..*       .*.       *..

e.  ...
    ***
    ...

CORNERS: namely, 'V' and 'L' types a.  *   *
    *..   .*.
    *..   ..*

CROSSES: namely, 'X' and 'T' types a.  .*.   b.  *.*   c.  ***
    ***       .*.       .*.
    .*.       *.*       .*.

BLOBS: others

```
+---+---+---+   eg. if E is erased,
|0 1|0 1|0 1|       then E0 gets its value from
| A | B | C |       - D1, A2, and B3
|3 2|3 2|3 2|           if CEG is to-be-erased line
+---+---+---+       - A3
|0 1|0 1|0 1|           if DEF is to-be-erased line
| D | E | F |       - D1
|3 2|3 2|3 2|           if BEH is to-be-erased line
+---+---+---+       - B2
|0 1|0 1|0 1|           if AEI is to-be-erased line
| G | H | I |
|3 2|3 2|3 2|       Similarly, for E1, E2, and E3
+---+---+---+
```

<R, M>: R is the radius, M is the angle
<R, M-N>: N is the rotation angle
o: rotation origin: given A', to test if the adjusted
                    A is an insider

DATA PROCESSING SYSTEM AND METHOD FOR FIELD EXTRACTION OF SCANNED IMAGES OF DOCUMENT FORMS

BACKGROUND OF THE INVENTION

1. Technical Field

The invention disclosed broadly relates to data processing systems and methods and more particularly relates to techniques for the extraction of field images from scanned document images.

2. Related Patent Applications

This patent application is related to the copending U.S. patent application Ser. No. 07/870,129, filed Apr. 15, 1992, entitled "Data Processing System and Method for Sequentially Repairing Character Recognition Errors for Scanned Images of Document Forms," by T. S. Betts, V. M. Carras, L. B. Knecht, T. L. Paulson, and G. R. Anderson, the application being assigned to the IBM Corporation and incorporated herein by reference, now U.S. Pat. No. 5,251,273.

This patent application is also related to the copending U.S. patent application, Ser. No. 07/870,507, filed Apr. 17, 1992, entitled "Data Processing System and Method for Selecting Customized Character Recognition Processes and Coded Data Repair Processes for Scanned Images of Document Forms," by T. S. Betts, V. M. Carras and L. B. Knecht, the application being assigned to the IBM Corporation and incorporated herein by reference.

This patent application is also related to the copending U.S. patent application Ser. No. 07/305,828, filed Feb. 2, 1989, entitled "A Computer Implemented Method for Automatic Extraction of Data From Printed Forms," by R. G. Casey and D. R. Ferguson, the application being assigned to the IBM Corporation and incorporated herein by reference, now U.S. Pat. No. 5,140,650.

3. Background Art

The above referenced copending patent applications by T. S. Betts, et al. describe the system context within which the invention disclosed herein finds application. The system disclosed by T. S. Betts, et al. defines document forms and then reads filled-in copies of those document forms which are scanned in to a digital imaging system. Each document form which is defined, includes several fields within which handwritten or typed information is to be entered. The T. S. Betts, et al. system examines the digital image of a scanned-in form to identify the form, and then locate the respective fields from which images are extracted for character recognition operations.

The process of field extraction for digital images of document forms is made difficult by the presence of preprinted background information in the form of text, boxes, and other visual prompts which have been included on the form to assist the person filling in the form. This preprinted background information must be identified in the scanned-in copy of the form and deleted from the form. This problem becomes acute when it is realized that the scanned-in form will be offset and skewed by virtue of the mechanical imprecision of the scanning device employed. Additional problems of an even more severe nature are encountered where the person filling in the form misregisters the handwritten or typed characters. Characters which overlap or go beyond the boundary of the fields will typically will not be completely extracted in prior art field extraction processes. In addition, where artifacts such as marks, creases, staples or other unintended marks which appear on the scanned-in image of the form, create still more severe problems in discriminating between the intended characters and the unintended artifact marks on the form.

OBJECTS OF THE INVENTION

It is therefore an object of the invention to automatically perform field extraction of images from document forms, in an improved manner.

It is another object of the invention to automatically perform field extraction of images from document forms whose fields have have been filled out with ambiguous marks.

SUMMARY OF THE INVENTION

The invention is a data processing method, system and computer program for extracting fields for digital images of document forms.

The system and method for field extraction, in accordance with the invention, creates a form definition for each form, which includes a form definition data set. In the form creation process, the user will mark each field which he intends to have subjected to field extraction, on a master form which he is creating. The inventive process then defines a field viewpoint structure for each field. The field viewpoint structure includes viewpoint primitive shapes such as line ends, box ends, crossed lines, V-ends, T-ends and blobs. The inventive process breaks the area within and surrounding the marked field into regions, an inner region enclosed by the marked field and eight outer regions which surround the marked field. The process then identifies the types and locations of viewpoint primitives in each region. The process then links those primitives which are appropriate, into a view relation. The field viewpoint structure is the set of all viewpoint primitives and any view relation for a field. The process then stores the coordinates of the field mark and the field viewpoint structure for each field. The collection of coordinates and field viewpoint structures for all of the fields on a form constitutes the form definition data set for a particular form. This data set is stored in the system until a particular filled-in copy of that form is received by the system for character recognition.

The second part of the invention is the process of field extraction for the fields on a scanned-in copy of the form which has been filled in. Field extraction must be preceded by a forms recognition process which identifies the form ID and which determines the skew and the offset of the scanned-in form. The field extraction process, in accordance with the invention, then begins by using the form ID to access the form definition data set. The process then examines every field on the scanned-in form. The process adjusts the coordinates where each field is expected, by using the offset values for this particular scanned-in form. The process then compares the stored viewpoint structure for a field in the data set, with the viewpoint structure of the field for the scanned-in form. For each inner and surrounding region of a field, the process determines if there are any viewpoint primitives in the data set. These are then compared with any viewpoint primitives in the corresponding region on the scanned-in form. After all regions are examined for a field on the scanned-in form, all matching viewpoint primitives are removed from the scanned-in image. Additional field analysis steps can also be performed. For example, partial removal of strange viewpoints, removal of long lines, and removal of jagged lines. In addition, overlapped pixels are retained and isolated pixels are retained if they are close enough to the field and when the skew of the scanned-in form is considered. These operations are performed for all of the fields on a scanned-in form. Then, the extracted field images are output to a character recognition process. Some character recognition processes also require the coordinates of the fields, and these can also be output from the inventive process.

The resulting field extraction of images from document forms is substantially improved in its accuracy by use of the inventive process.

DESCRIPTION OF THE FIGURES

These and other objects, features and advantages will be more fully appreciate with reference to the accompanying figures.

FIG. 1 which is composed of FIGS. 1B and 1C, is an overall architectural diagram of the invention.

FIG. 1A illustrates the machine generated data structure (MGDS) 50A from the forms recognition and field extraction processor FIG. 2A illustrates the master form 10F.

FIG. 2C illustrates the scanned form image 10' of a document form.

FIG. 2D illustrates the extracted field images 10" from the scanned form image 10' of FIG. 2C.

FIG. 4 illustrate the structure of an example processing template 33, showing in particular the form definition data set 400, in accordance with the invention.

FIG. 6 is a flow diagram of a sequence of operational steps for creating the form definition data set 400.

FIGS. 7, 7a, 7b is a flow diagram of a sequence of operational steps for performing forms recognition process 24A and the field extraction process 24B.

FIG. 17 shows the long lines case.

FIG. 18 shows the case of lines or boxes of a form inside the field boundary.

FIG. 19 shows the background text.

FIG. 20 shows background symbols.

FIG. 24 shows the viewpoint structure.

FIG. 25 shows the viewpoint relations.

FIG. 26A shows the case where every viewpoint connects at most two other viewpoints.

FIG. 26B shows a non-linear example.

FIG. 27 shows examples of lines, corners, crosses and blobs.

FIG. 28 shows erasing.

DISCUSSION OF THE PREFERRED EMBODIMENT

The invention described herein is a data processing system and method for field extraction of scanned images of document forms. The process finds application in a forms processing system described in the copending patent applications by T. S. Betts, et al., cited above. In order to provide some background for the invention disclosed herein, the following description will cover some of the salient features of the T. S. Betts, et al. system. This is further illustrated with reference to FIGS. 1-1A, 2A-2D, 3 and 5.

Figure 5:
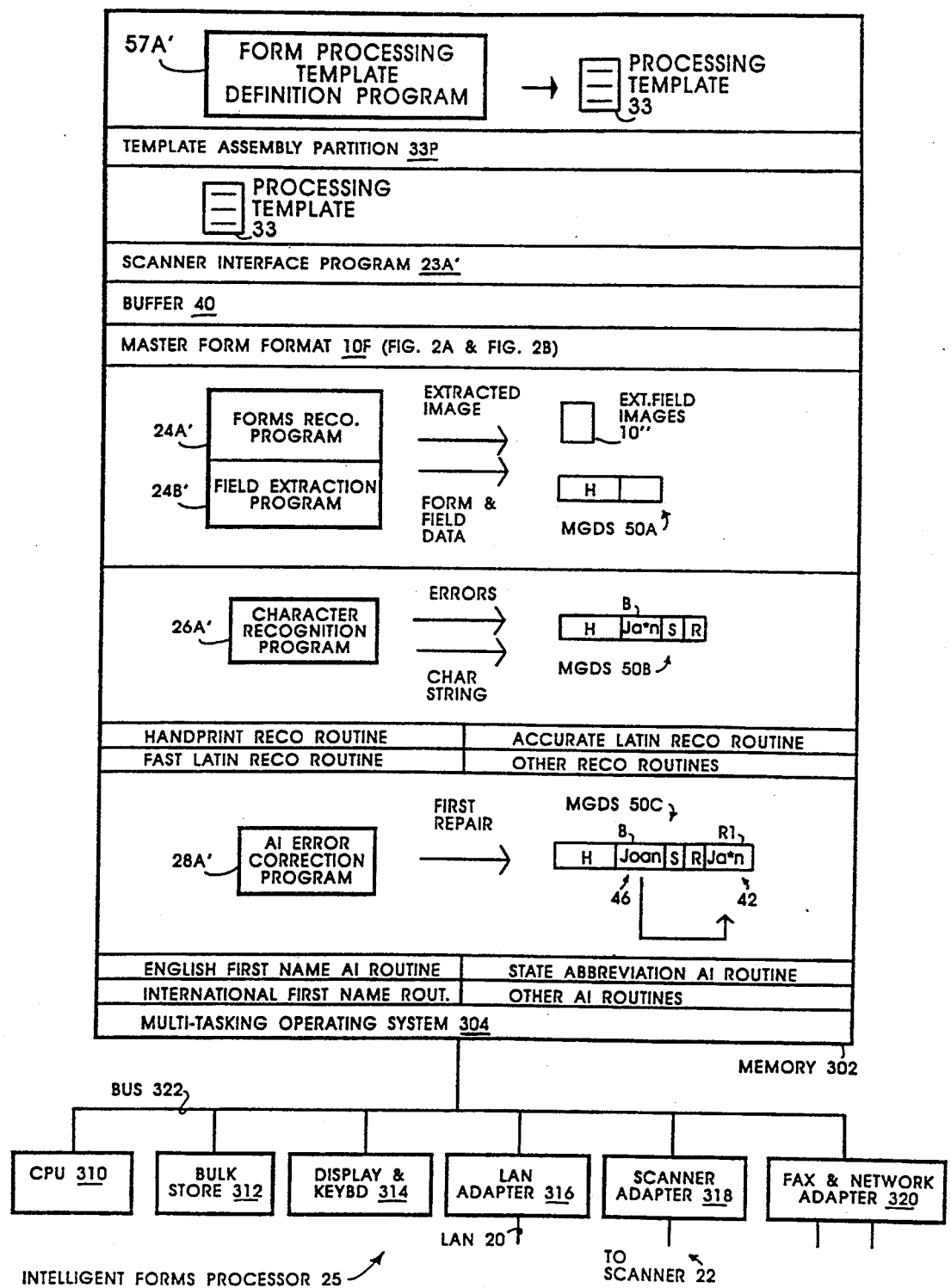
FIG. 5 illustrates a detailed architectural diagram of the intelligent forms processor 2S.

FIG. 1 shows an overall architectural description of the data processing system for repairing character recognition errors for digital images of document forms. FIG. 1 is partitioned into a left half FIG. 1B and a right half FIG. 1C. A hard copy document 10 is scanned into the system with a scanner 22, resulting in a document image 10' which is shown in FIG. 2C. In the preferred embodiment of the invention, an intelligent forms processor 25, shown in greater detail in the architectural diagram of FIG. 5, provides the form processing template definition processor 57, which generates the processing template 33. The document form processing template 33 specifies the identity and preferred sequence for selected, customized character recognition processes and selected, customized coded data error correction processes. It is these processes which the user feels are reasonably likely to be needed to automatically process a selected batch of documents whose fields have certain, anticipated, uniform characteristics. In accordance with the invention disclosed herein, the processing template 33 shown in FIG. 4 includes the form definition data set 400. It is a form definition data set which is created by the process of the invention disclosed herein and which is utilized by the field extraction process portion of the invention disclosed herein. An example structure for the document form processing template 33 is shown in FIG. 4.

In the preferred embodiment of the invention, the intelligent forms processor 25 of FIG. 5, also provides the scanner interface process with the scanner 22. The intelligent forms processor 25, shown in dotted outline in FIG. 1, also includes a buffer 40, a forms recognition and field extraction processor 24, a character recognition processor 26 and an artificial intelligence error correction processor 28. In the preferred embodiment of the invention, these various processors are implemented through corresponding computer programs which, when executed, perform the respective processes. In an alternate embodiment of the invention, as is shown in FIG. 1, the form processing template definition processor 57, the scanner processor 23, the buffer 40, the forms recognition and field extraction processor 24, the character recognition processor 26 and the artificial intelligence error correction processor 28, may each be separate processors connected together by the local area network (LAN) 20. In order to facilitate an understanding of the invention, the separate processor embodiment shown in FIG. 1 will be described first.

The local area network (LAN) 20 interconnects the template processor 57, scanner processor 23, buffer 40, forms recognition and field extraction processor 24, character recognition processor 26 and artificial intelligence error correction processor 28, to the host computer 34. Also connected to the LAN 20 is the data base error correction processor 30 and the manual verify and correction processor 32. In addition, an additional image capture facility buffer server 40' can be connected to the LAN 20. The host computer 34 has connected to it a document image storage 36, a coded data storage 35, and a repair history storage 38.

When a selected batch of document forms is to be processed by the system, the method of the invention begins by inputting a document form processing template 33 which has been selected by the user. The form definition data set 400 is extracted from the processing template 33, and the field extraction information 404 stored therein is used to perform the field extraction operation, in accordance with the invention. The template will include a first sequence specification for a first plurality of character recognition processes that will be run by the character recognition processor 26. These will include a first occurring and a second occurring character recognition processes. The processing template 33 will also include a second sequence specification for a second plurality of coded data repair processes, such as will be carried out in the artificial intelligence error correction processor 28, or the data base error correction processor 30, or the manual verify and correction processor 32. These processors can include a first occurring and a second occurring coded data repair process.

A document 10 from the batch, is scanned into the system by means of the scanner 22, forming the document image 10' shown in greater detail in FIG. 2C. The document image 10' is a bit map representation of the image of the hard copy document 10. The scanner 22 outputs the document image 10' over the local area network 20 to the forms recognition and field extraction processor 24. A copy of the document image 10' can also be transferred to the host computer 34 and a temporary indexing identity can be assigned to the document image 10' so that it can be temporarily archived in the document image storage 36.

The forms recognition and field extraction processor 24 will include a library of master form definition data sets 400 of forms which are to be processed by the system. The model of a form consists of a form pattern and a description of each field contained on a form. The form pattern is a set of characteristics that are used to distinguish one form type from another. The field description consists of the location of the field on the form expressed in Cartesian coordinates, an acceptance threshold for character recognition, identifying and field specifying information. A data field location can be expressed in the model by two points that describe the opposing corners of a rectangle. The rectangular area may be called a mask. Inspection of FIG. 4 will show that the form definition data set 400 includes form recognition information 402 which is described in greater detail in the copending U.S. patent application by R. G. Casey, et al., cited above. Also, in accordance with the invention, the field extraction information 404 is included in the form data set 400. The field extraction information 404 will include a first field 405 with its field coordinates 406 and its viewpoint structure 408. A second field 405' can be included in the field extraction information 404, which includes its field coordinates 406' and its viewpoint structure 408'. All of the fields on a form which are to be subjected to character recognition, have a field entry 405 and corresponding coordinate entries 406 and viewpoint structure entries 408, in accordance with the invention, in the form definition data set 400.

When the document image 10' is input to the forms recognition and field extraction processor 24, the image is analyzed to identify the form so that the appropriate master form definition data can be accessed. Several methods can be used for form recognition. One method matches the form number which may be typically printed on the document. A second method compares the layout or geography of the forms text and lines which may differentiate form types. A third method relies on the horizontal and vertical lines of the form. Once the document image 10' for the form is characterized, the corresponding master form definition data can be accessed which defines the coordinates for the respective fields, the names of the fields, and the code page for each respective field in the form.

When the scanner 22 scans in the document 10, the scanner processor 23 can perform some front-end operations such as rescaling and compression of the image into an image file to which is assigned a file address. The image file of the document image 10' can be temporarily buffered in the buffer 40 or alternately in the buffer server 40', accessible under an assigned address. Alternately, the scanner processor 23 can output the document image 10' directly to the forms recognition and field extraction processor 24.

Figure 7B:
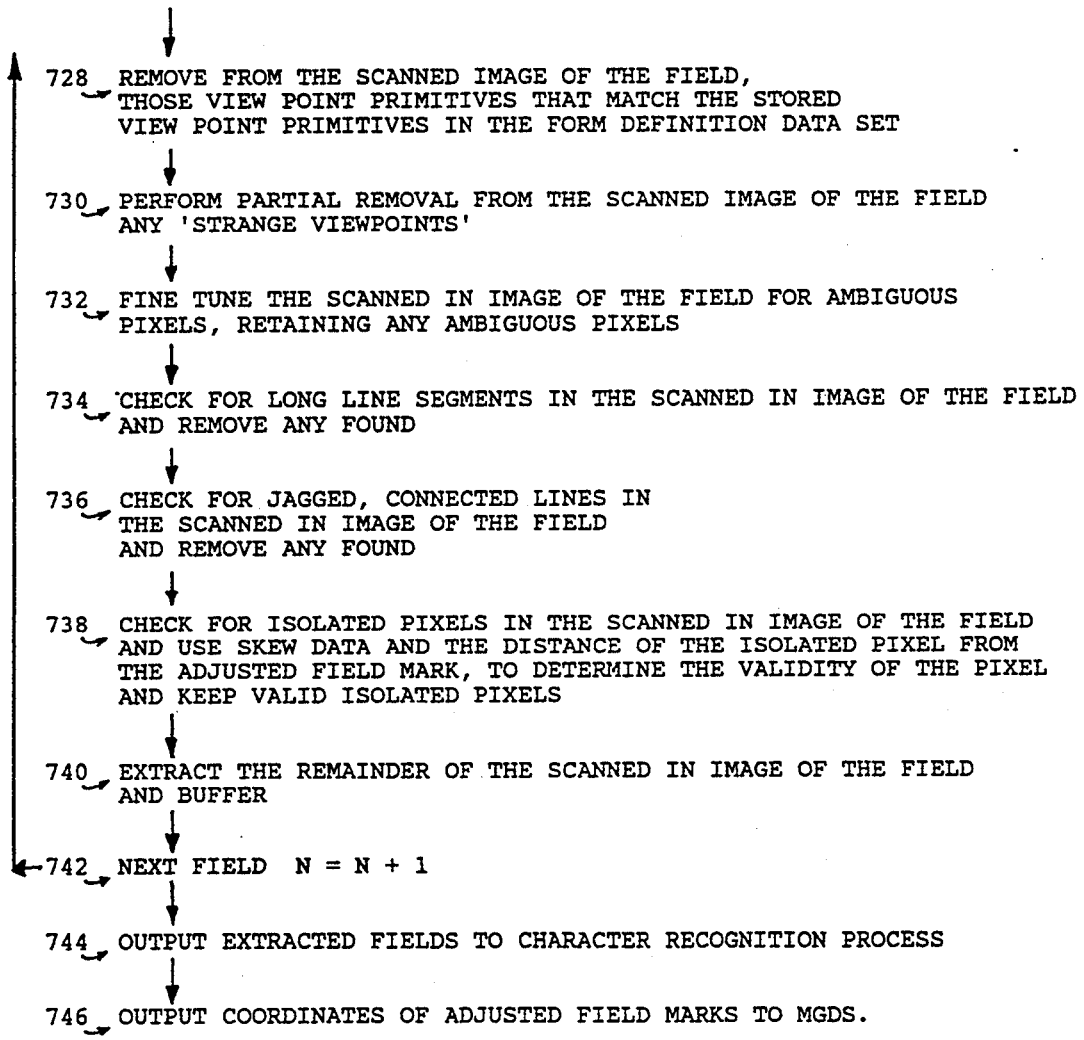

The forms recognition and field extraction process 700 shown in FIG. 7 is broken up into the forms recognition process 24A and the field extraction process 24B. This process will be described in greater detail below.

Figure 2B:
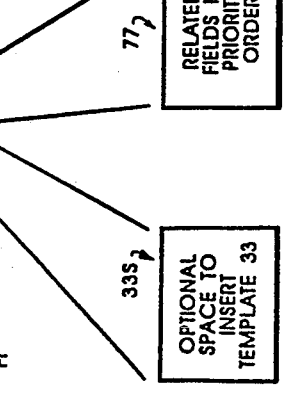
FIG. 2B illustrates the master MGDS 50M corresponding to the master form 10F of FIG. 2A.
Figure 2C:
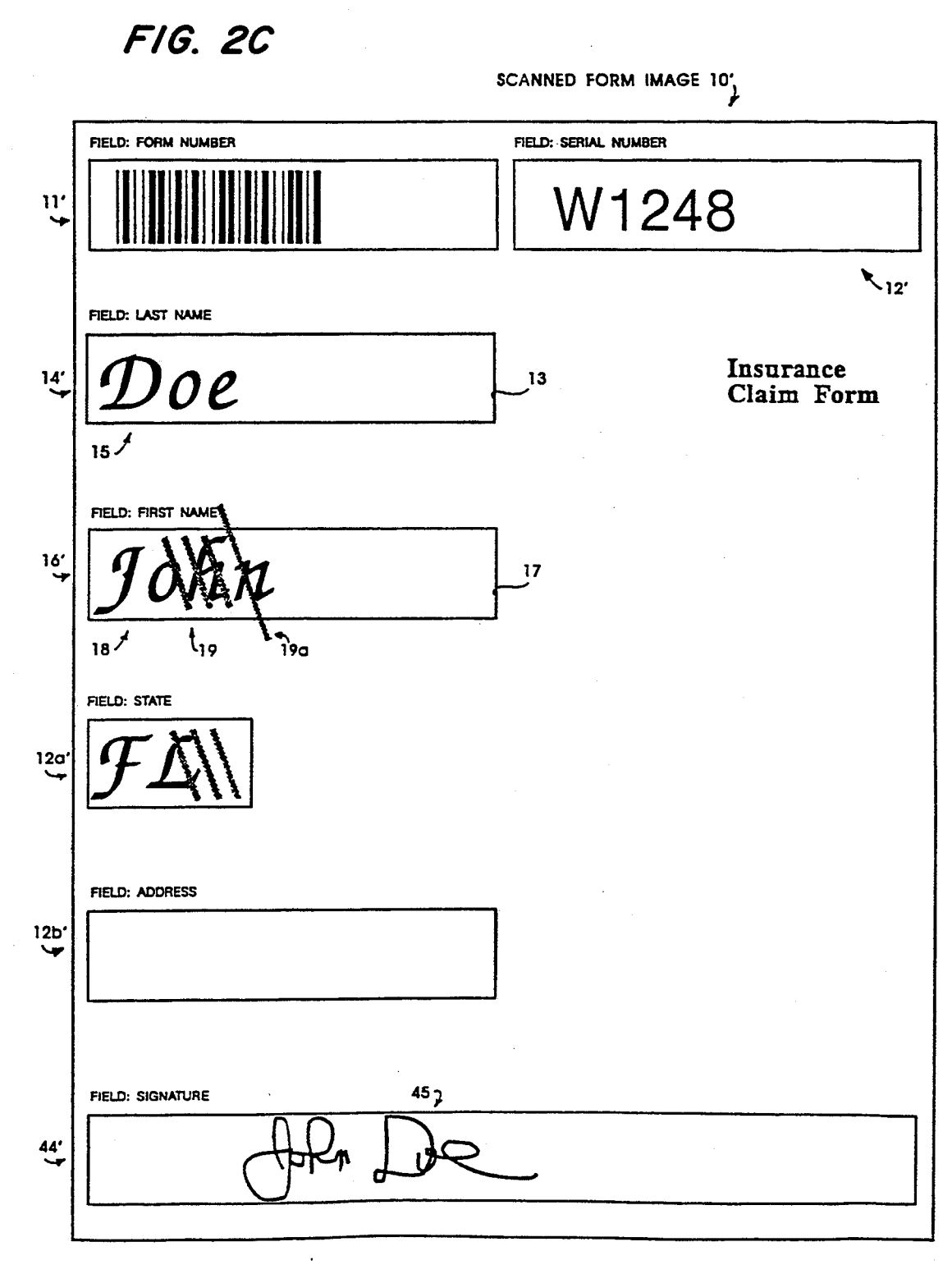

FIG. 2B shows additional information which is included in the master form definition for the master form 10F shown in FIG. 2A. FIG. 2B depicts a master machine generated data structure (MGDS) 50M. The fixed form data 65 is included in the master MGDS 50M, such as the form name "claim," the number of fields and other like information. The identity of related fields, expressed in their crier of priority, is inserted at 77 in the fixed form data portion of the MGDS. In addition, optional space can be provided insert the form processing template 33 in the space 33S. Also included in the fixed form data 65 of the master MGDS 50M of FIG. 2B is the page information PI for each page of the form. In the example shown herein, a single page form is employed. Fixed form data for a page would include for example the page number. Also included in the master MGDS 50M is fixed field data 64 for each of the six data fields in the master form 10F of FIG. 2A. Each field on the form is represented by field data segment, such as field data segment 52M in FIG. 2B which corresponds to the first data field 14F in FIG. 2A. The field data segment 52M includes fixed field data 67 such as the field coordinates 64. Shown in FIG. 2B are the coordinates X1 and Y1 for the upper left-hand corner and X2 and Y2 or the lower right-hand corner of each rectangular field of the master form 10F of FIG. 2A. Also included in the fixed field data 67 is the field name, for example for the field data segment 52M corresponding to the last name field 14F of FIG. 2A, specifies that the field name 68 is "last name." Also included in the fixed field data 67 of FIG. 2B is the field type 7C. For example, the field data segment 52M of FIG. 2B has a field type "A/N" which corresponds to alphanumeric.

Other field data 67 can be included. The master MGDS 50M shown in FIG. 2B is one example of how the master form definition data can be organized and stored in the forms recognition and field extraction processor 24. The forms recognition and field extraction processor 24 will organize the fixed form data 65 for the form information FI and the page information PI and it will organize the fixed field data 67 for each respective field data segment 52M, etc. into a master MGDS 50M which it will transfer to the character recognition processor 26. Prior to such transfer, additional data will be added which is developed by the forms recognition process steps 100 through 102B, and in particular the information which will be added is the skew and offset data 62 for the form image 10', and optionally, the template 22 can be inserted into the space 33S.

Additional spaces can be allocated in the master MGDS 50M of FIG. 2B, for information which will be added at later stages in the recognition process. For example, the form return FR field 72 can have space allocated, optional document image file pointer 60 and optional extracted image file pointer 74 can be allocated. The coded data portion 75 can be added, among others. Each of these allocated fields in the MGDS 50M will be empty until they reach the processing stage in the system where the corresponding data is generated in the character recognition repair of the form.

Figure 3:
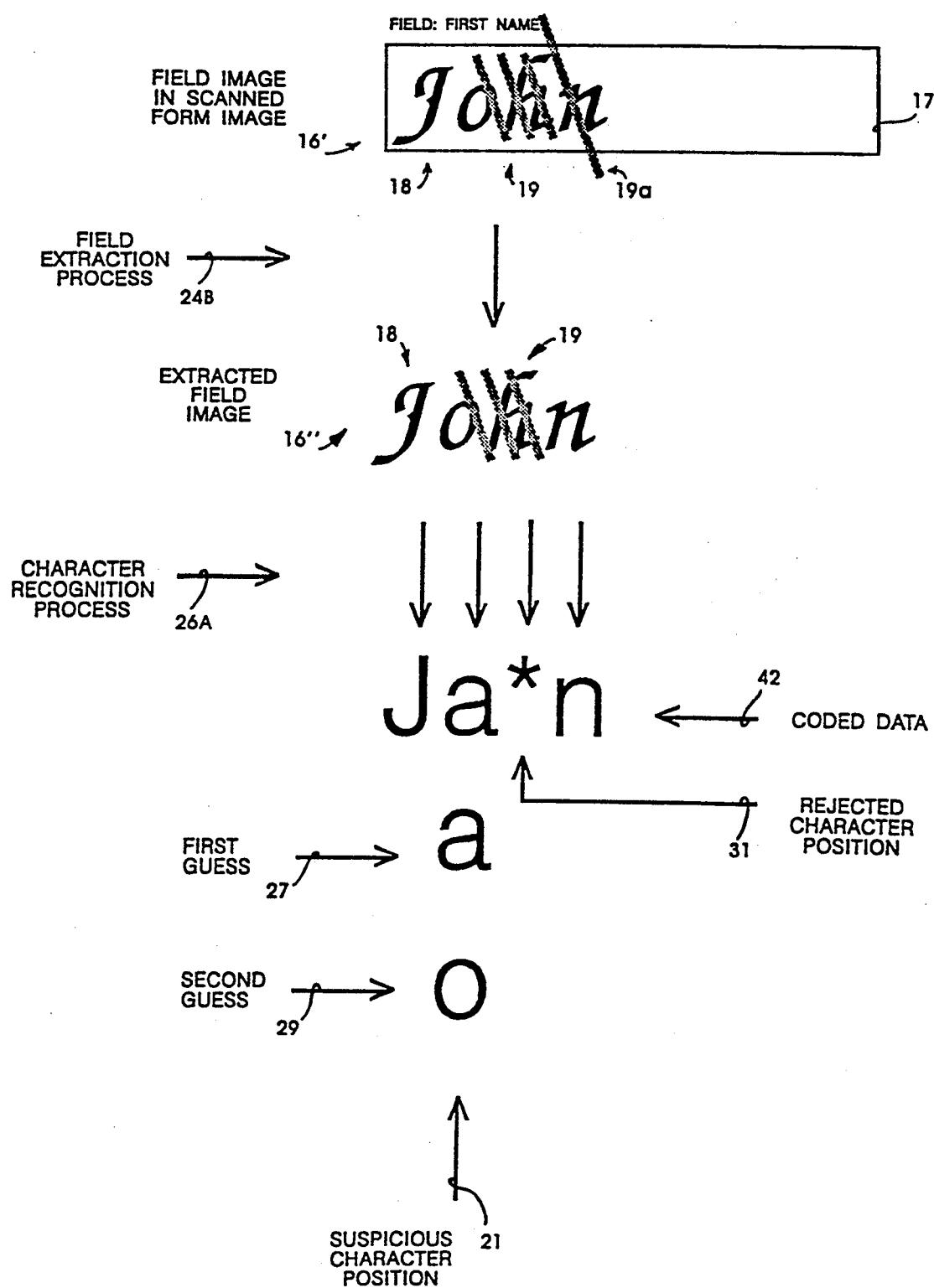
FIG. 3 illustrates the sequence of processing steps for the field 16' in the document form image 10' shown in FIG. 2C.

Reference can be made to FIG. 3 which illustrates an example field extraction process. FIG. 3 shows the field image 16' for the first name field as it appears on the document image of FIG. 2C. The field image 16' is shown with the surrounding box 17, the characters 18 and the spurious lines 19 and 19a. In the process of field extraction, the image of the box 17 is removed. In addition, in the process of extraneous line removal, the image of the extraneous line 19a is eliminated, because a portion of it lies outside the pre-defined area of the field 16'. However, for this example, the extraneous lines 19 have not been removed from the image 18 of the characters in the field 16', as can be seen in the resulting extracted field 16" of FIG. 3. The extracted field image 16" will appear on the extracted field images 10" of FIG. 2D for the form.

An additional example of spurious lines which remain in the extracted field is shown for the state field 12a' in the form image 10' of FIG. 2C, whose corresponding extracted image 12a' still possesses the spurious lines overlapping the letter L in the state abbreviation for the state of Florida "FL."

Then the field extraction process assembles the fixed form data 65, for example the form name 66, etc., along with the fixed field data 67, for example the field name 68, type 70, field coordinates 64, etc., into the master MGDS 50M shown in FIG. 2B. Then, variable form data is inserted into the master MGDS 50M. For example, the form return code 72, which currently has a value of "zero," the document image pointer 60, which is the pointer address for the file of the document image 10', the extracted image pointer 74, which is the pointer address for the file containing the extracted image 10", the skew and offset value 62, and other data currently available at this stage in the forms recognition and field extraction processor 24.

The field extraction process outputs the MGDS message 50A shown in FIG. 1A, to the character recognition processor 26. If this were the multi-task embodiment of these processes in the intelligent forms processor 25 of FIG. 5, then the transfer of the MGDS message 50A would be to a commonly accessible partition in the memory of the processor 25. Alternately in the multiprocessor LAN embodiment of FIG. 1, the MGDS message 50A is transferred over the LAN 20 to the character recognition processor 26.

The field extraction process outputs the extracted images file 10". The extracted field images file 10" can be placed in a file whose address is referred to by the extracted image pointer 74, and the extracted image 10" can then be stored in the buffer 40 or the buffer server 40'. Alternately, the extracted field images 10" can be transferred directly to the character recognition processor 26.

FIG. 1A shows a more detailed illustration of the MGDS 50A as it is output from the forms recognition and field extraction processor 24. In particular, the MGDS 50A shown in FIG. 1A is depicted for the first field data segment 52A and the second field data segment 54A corresponding to the first two out of the six fields of the form image 10' shown in FIG. 2C.

The MGDS 50A shown in FIG. 1A also includes a portion 59 for the storage of the template ID. For the example shown, the template ID is "flood claims," and this will be inserted into portion 59. Also included in the MGDS 50A of FIG. 1A is a portion 76 for storing the field re-route destination (RR). If a particular combination of errors results in the template pointing to a re-route destination, the identity of that re-route destination will be stored in portion 76. Also shown in FIG. 1A is the portion 63 of MGDS 50A, which will store the identity of the recognition routine for each respective field subjected to character recognition in the character recognition processor 26. Also shown in FIG. 1A is the optional inclusion of the processing template 33 in the MGDS 50A. Also, FIG. 1A shows the location of the related fields data 77 in the MGDS 50A.

Optionally, an image data parameter (not shown) may be included in the MGDS message 50A, provided by the processor 24. After the processor 24 has performed its field extraction operation, the cleaned-up image of the field can have its bit map arranged in serial order and optionally compressed and loaded into MGDS 50A.

It is appropriate at this point to discuss how the preferred embodiment of the invention uses a single intelligent forms processor 25 to execute in multi-task form, the respective processes carried out in the forms recognition and field extraction processor 24, the character recognition processor 26, and the artificial intelligence error correction processor 28.

FIG. 5 shows a detailed architectural diagram of the intelligent forms processor 25. The processor 25 includes a memory 302 which is connected by the bus 322 to the CPU 310, the bulk storage device 312, the display, mouse pointing device and keyboard 314, and the LAN adapter 316. The scanner adapter 318 connects the scanner 22 to the bus 322. The LAN adapter 316 connects the LAN 20 to the bus 322. In addition, an optional FAX and communications network adapter 320 can couple a fax telephone line to the bus 322 and can connect a data communications network to the bus 322. The CPU 310, can be for example an Intel 386 or 486 data processing unit. The bulk storage device 312 can be a hard disk storage such as a 200 megabyte hard disk storage, or it can be a combination of a hard disk magnetic storage and an optical read-write storage.

The memory 302 will include several computer programs, each of which is a sequence of executable instructions to carry out a process. The memory 302 includes the form processing template definition program 57A' which carries out the processes 57A performed by the form processing template definition processor 57. In accordance with the invention, the form definition data 400 is created by program 600 of FIG. 6 and inserted into the template 33, shown in FIG. 4. The memory 302 further includes the template assembly partition 33P which is a space set aside for the assembly for the template 33 through the operation of the template definition program 57A'. Also included in the memory 302 is the form processing template 33, which is represented for example as Table 1 and FIG. 4. Still further, a handprint recognition routine, a fast Latin font recognition routine, and an accurate Latin font recognition routine are also provided in the memory 302 for use with the character recognition program 26A'. Still further, an English first name AI error correction routine, an international first name AI error correction routine, and a state abbreviation AI error correction routine are provided in the memory 302, to be used with the AI correction program 28A'. The memory 302 includes a scanner interface program 23A' which carries out the processes performed by the scanner processor 23, as described above. Also included in the memory 302 is a partition for the buffer 40. Still further, a partition is provided in the memory 302 for the master form format 10F which is shown in FIG. 2A and in FIG. 2B.

The memory 302 provides a partition for the forms recognition program 24A' which carries out the forms recognition process 24A. The partition also includes the field extraction program 24B' which carries out the field extraction process 24B of FIG. 7. The result of the execution of the forms recognition program 24A' and the field extraction program 24B' is the production of the extracted field images 10" and the production of the MGDS 50A, as has been described above.

Another partition is provided in the memory 302 for the character recognition program 26A' which carries out the character recognition process 26A.

A partition is also provided in the memory 302 for the artificial intelligence error correction program 28A' which carries out the artificial intelligence process 28A.

A multi-tasking operating system 304, such as IBM's Operating Systems/2, Extended Edition, can be used in multi-tasking mode to control the multi-task execution of the programs in the memory 302. Alternately, the operating system 304 need not oversee the multi-task execution of the application programs, but instead the application programs can be sequentially executed for processing a particular data field segment in the MGDS.

The provision of a facsimile and network adapter 320 connecting a telephone facsimile line to the processor 25, enables the receipt of facsimile images in lieu of images provided through the scanner adapter 318. Similarly, the connection of the adapter 320 to a data communications network enables the receipt of existing document image files from the network, in lieu of the production of such document image files by the scanner 22.

The MGDS message 50C is output from the AI error correction processor 28 over the local area network 20 to the second repair station which is the data base error correction processor 30. The data base error correction processor 30 contains a data base of customer names used in the particular application running on the host computer 34. The host computer 34, in this example, manages a document image archiving system for insurance forms, for an insurance company. The insurance company will have many insured customers and the list of those insured customers will be contained in the data base error correction processor 30. By comparing suggested character strings in the MGDS 50C which is input to the data base error correction processor 30, a selection can be made of that character string which is the same as the actual name of one of the insured customers in the particular host computer application. In this example, the MGDS 50C is input from the AI error correction processor 28 to the data base error correction processor 30 where there is appended thereto a second repair segment R2. The second repair segment R2 will characterize the second repair performed by the processor 30. In an alternate embodiment, the data base error correction processor 30 can be combined with the artificial intelligence error correction processor 28 and the character recognition processor 26 in the same processor 25 in a multi-task application.

The manual verify and correction processor 32 will accept the MGDS 50D and will append to it a third repair segment R3. Depending upon the application, a required manual verification can be made on the result of the sequential correction for the character string which has been flagged for the particular field.

The coordinates for the character or the entire string as the application may require, are abstracted from the reject character information S originally produced by the character recognition processor 26. These are the coordinates of the location in the image bit map for the field and the reject or suspicious character identified by the character recognition processor 26. The correction processor 32 will use these coordinate values to highlight and/or magnifying the field as it is displayed to the operator. A copy of the document image 10' will be delivered over the LAN 20 to the correction processor 32, for viewing by the operator. The location specified by the coordinates of the rejected or suspicious character are used to highlight and/or magnify that portion of the document image displayed. The operator can then quickly compare the highlighted portion of the document image to the character string 48 "John," which is also displayed in alphanumeric characters on the display screen of the processor 32. If the operator accepts the representation of the string 48 "John," then a validation acceptance is recorded in the segment R3. The validation indication can be entered into the segment R3, for example under the comments portion.

Alternately, if the operator wishes to make a change such as capitalizing all of the characters to change string 48 into string 49 "JOHN," then, the string 48 is transferred from the character data buffer B to the input data repair portion 55 of the segment R3. Then the processor 32 loads the corrected value string 49 "JOHN" into the character data buffer B. Other appropriate fields are filled in the segment R3, such as the field name, character position, and comments.

At a later time, if the host computer 34 is instructed to conduct an audit as to how the character string in buffer B for a particular field data segment in the MGDS 50E was repaired, the history of repairs for the character recognition of that field can be ascertained by accessing the MGDS 50E from the repair history storage 38. Each respective repair segment corresponding to the field being audited, can be examined to determine how the repair was carried out. For example, for the second field segment 54 which represents the first name field 16', an audit of the character recognition repairs would examine the field data segment 54, the repair segment R3, the repair segment R2, and the repair segment R1, in that sequential order. This would enable working backwards from the final best estimate of the field contained in the field data segment 54 of the MGDS 50E, backward in reverse sequence for the repairs that were executed on that field. If such an audit were conducted in order to improve the overall repair process, a clear indication as to how each stage of the repair was conducted would be revealed from the collective repair history represented by the repair segments in the MGDS 50E.

The resulting MGDS message 50E now contains a history of the sequential repairs performed on the contents of the first name field 16. The MGDS message 50E can then be transmitted over the LAN 20 to the buffer storage 40' for temporary storage. Alternately it can be transferred to the repair history storage 38 for long term storage. Alternately, it can be transferred to the host computer 34 where the contents of the coded data buffer B for the field data segment 54, which is the string 49, can be loaded into the coded data storage 35. The contents can be used for example as an index value where the application uses the insured customer name as the index value to store the document image 10'.

The form processing template 33 may be stored in the buffer 40 of the intelligent forms processor 25. Alternately, it may be stored in the buffer server 40' of FIG. 1. When a selected batch of document forms is to be processed, the user will select the processing template 33 which specifies the identity and preferred sequence for the customized character recognition processes and customized coded data error correction processes which the user believes are reasonably likely to be needed to automatically process the incoming batch document forms whose fields have certain uniform characteristics anticipated by the user.

Detailed Description of the Process to Create the Form Definition Data Set 400

As was described above, the processing template 33 shown in FIG. 4 is created in the process 57A. Reference can be made to the copending patent application by T. S. Betts, et al. for a detailed description of how the process 57A creates the header portion 78 and the field processing definition portion 80 of the processing template 33 of FIG. 4. The invention disclosed herein deals with the process for forming the definition data set 400 component of the processing template 33. This is shown in the flow diagram of FIG. 6.

The process for creating the form definition data set 400 begins in FIG. 6 with step 600 which prompts the user to input a form name. The form name is input to the system shown in FIG. 5 and then the process continues in step 602 by defining the form recognition features. This portion of the process is described in greater detail in the copending U.S. patent application by R. G. Casey, et al., cited above. Then in step 604 the form recognition features are buffered.

Then in step 606 a loop is started to define the fields. There may be a plurality of fields and they will be identified by an index I which is initially set equal to one. Then in step 608, the process issues a prompt to the user to mark the ith field. Then in step 610 the field viewpoint structure is defined for the ith field. In step 612 the coordinates of the marked field are gotten. Reference can be made here to the example field shown in FIG. 8.

Figure 8:
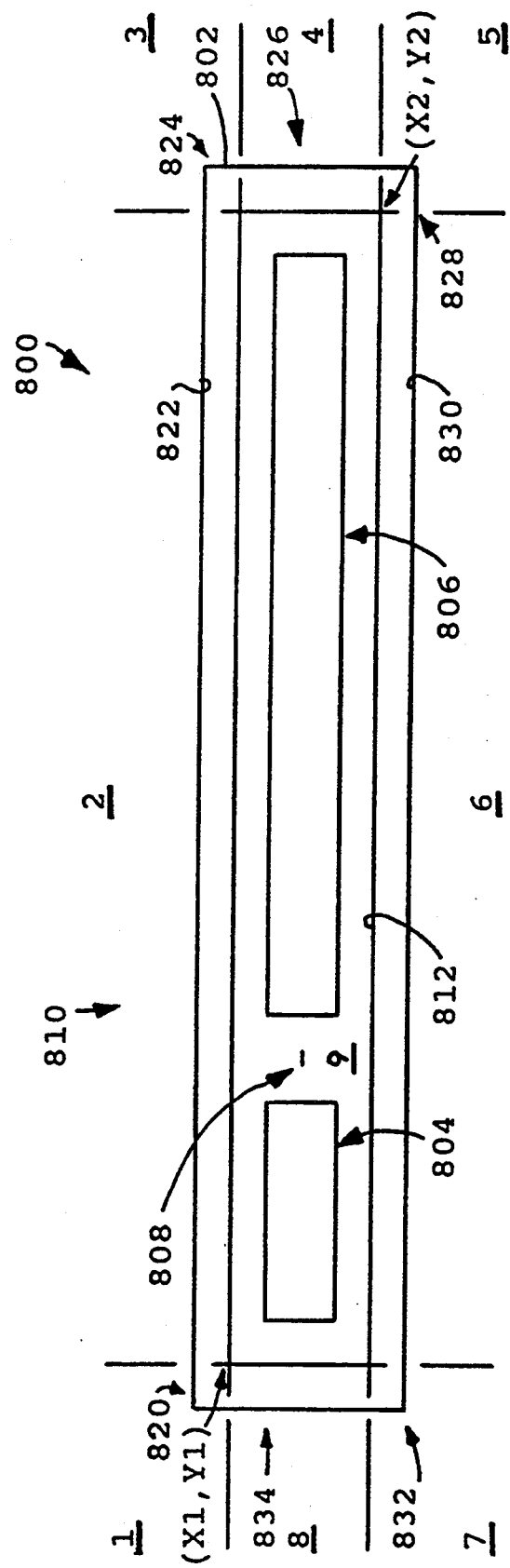
FIG. 8 is an example field, illustrating how it is divided into inner and surrounding regions, in accordance with the invention.

FIG. 8 shows the field 800 which includes a surrounding box 802 and which also includes enclosed boxes 804 and 806 which are separated by a dash line 808. Also in proximity to the box 802 and immediately above it is a body of text 810 which reads "FIELD-:TELEPHONE NUMBER." Step 608 of the flow diagram of FIG. 6 results in the positioning of a marked box 812 shown in FIG. 8. The marked box 812 can be generated by the user manipulating a pointing device such as a mouse in the system of FIG. 5, to begin at an upper left-hand coordinate X1,Y1 and to end at a lower right-hand coordinate X2,Y2. The step 612 of the flow of FIG. 6 gets the coordinates X1,Y1 and X2,Y2. Optionally, the coordinates for the other two vertices of the box 812 can also be gotten at this time, namely X3,Y3 for the upper right-hand vortex and X4,Y4 for the lower left-hand vortex. These two additional vertices are optional.

Then step 614 of the flow diagram of FIG. 6 starts a loop to analyze the eight neighbor regions and the inner region for the field 800 of FIG. 8. The surrounding regions are identified as the upper left UL, upper upper UU, upper right UR, the extreme right RR, the lower right or down right DR, the down down DD, the down left, DL and extreme left are LL. These are correspondingly numbered 1, 2, 3, 4, 5, 6, 7 and 8 for these regions in FIG. 8. The enclosed interior region 9 is the region enclosed by the box 812 marked by the user in step 608.

The loop which begins at step 614 will increment through regions 1-9 of field 800 of FIG. 8. For each region, a determination is made in step 616 as to whether there are any background viewpoint primitives within that region. A background viewpoint primitive is a line end, a box end, crossed lines, V-end, T-ends, or blobs. This analysis is described in greater detail below.

The loop then proceeds to step 618 in FIG. 6, to buffer any viewpoint primitive identified for the region defined by the user. The loop increments through all nine regions and after the ninth region is analyzed, step 618 of FIG. 6 flows to step 620 which links any appropriate viewpoint primitives into a view relation for the ith field. An additional description of this portion of the process will be given below. Then the flow diagram of FIG. 6 flows to step 622 which buffers the field viewpoint structure for the ith field. Then in step 624, the index value I is incremented by one and the loop returns to step 608 for all of the fields to be defined by the user. When the user indicates that he has completed defining fields, then the process flows to step 626 which stores the form recognition features defined in step 602, into the form definition data set 400 as the form recognition information 402. Then the flow diagram of FIG. 6 flows to step 628 which stores the coordinates for each field 405 stores the coordinates 406 and the viewpoint structure 408 in the field extraction information 404 of the form definition data set 400. This is stored for each of the fields defined by the user in the process of FIG. 6.

The resulting form definition data set 400 is shown in FIG. 4, and an example of the form definition data set 400, illustrating in detail the field extraction information 404, is shown in Table 1.

Detailed Description of the Field Extraction Process 24B

The forms recognition and field extraction process 700 shown in FIG. 7 is broken into the forms recognition portion 24A and the field extraction portion 24B.

The forms recognition portion 24A of FIG. 7 starts after step 700 which scans in the filled-out form. Then step 702 performs the forms recognition process. This process is described in greater detail in the copending U.S. patent application by R. G. Casey, et al. cited above.

Then step 703 outputs the identity of the form as the form ID and step 704 outputs the skew and the offset data for the particular scanned-in form. The skew is defined as the error in the Y direction or the scanning direction which is the motion of the document as it went through the scanner, divided by the error in the X direction which is perpendicular to the Y direction. This is represented as delta Y1 divided by delta X1. The offset is the displacement of the scanned-in form from its expected nominal position and the Y offset value in the direction of motion of the form is delta Y2 and the horizontal or perpendicular offset is delta X2. These values of skew and offset are then output to the field extraction process 24B.

The field extraction process 24B of FIG. 7 begins with step 710 and flows to step 712 which gets the field definition information from the forms definition data set, using the form ID output in step 703. Then step 714 starts a loop for incrementing through all of the fields on the form. The index value of N is set equal to one. Then in step 716 the field mark coordinates are extracted from the definition data set. Then in step 718, the adjusted coordinates are computed for the offset of the form. These are the coordinates for each respective field. For example the field 800 shown in FIG. 8 will have the coordinate X1 adjusted by adding to it the value delta X2 and it will have the coordinate Y1 adjusted by adding to it the value delta Y2 from the offset data output in step 704. This is done for X1 and Y1 and for X2 and Y2 in the field 800 of FIG. 8. Optionally, it can also be done for X3,Y3 and X4,Y4.

Then step 720 of FIG. 7 starts the loop to compare the stored viewpoint structure in the form definition data set 400 with the scanned-in viewpoint structure for each respective field, in this case the nth field. Then step 722 starts another loop which cycles through the nine regions 1-9 indicated in FIG. 8, determining if any background viewpoint primitive exists in the ith region of the form definition data set field. This would be a determination as to whether there is a line end, box end, or other viewpoint primitive for the particular region under investigation, the ith region. Then step 724 determines if there is a background viewpoint primitive found, then it is compared with any viewpoint primitive in the corresponding ith region of the scanned-in image of the field currently under investigation. This comparison will then identify the type of viewpoint primitive found in the scanned field image and it will compare the relative location of the viewpoint primitive in the scanned image with the expected location of the viewpoint primitive in the form definition data set. The type of the viewpoint primitive is buffered and the relative location is buffered in step 724. Then step 726 will increment the index value of I for the regions 1-9 until all nine regions indicated in FIG. 8 have been analyzed. Then the process of FIG. 7 flows to step 728 which removes from the scanned image of the field under investigation, those viewpoint primitives which match the stored viewpoint primitives in the form definition data set 400.

Then the flow diagram of FIG. 7 flows to step 730 which performs a partial removal from the scanned image of viewpoint structures called strange viewpoints. This form of structure is described in greater detail in the discussion below.

Then step 732 starts fine tuning the ambiguous pixels in the remaining field image by checking for overlapped pixels. Where there are overlapped pixels, the pixel at the overlapped point is retained. This is described in greater detail below. Then in step 734 a check is made for any long line segments and they are removed. This step is further described below. Then in step 736, a check is made for jagged, connected lines and they are removed. This step is further described below. Then in step 738, a check is made for isolated pixels and use is made of the skew data output in step 704, and the distance from the adjusted field mark, to determine the validity of the isolated pixel. If the isolated pixel is determined to be valid, then it is retained. This step is described further below.

Then step 740 extracts the remainder of the field image of the scanned-in form for the field under investigation, and buffers it in the system of FIG. 5. Step 742 increments the field index of N to the next value and loops back to step 716, until all of the fields in the form have been processed. Then the flow diagram flows to step 744 which outputs the extracted field to the character recognition process. Optionally, step 746 can also output the coordinates of the adjusted field mark which may be used by the character recognition process and which also can be stored as the modified coordinates for the field in the MGDS, as is shown in FIG. 1A, where the field coordinate 64 is adjusted in its value to become the adjusted field coordinates output by step 746.

Example

Table 1 gives a specific example of the field extraction information 404 generated by the field extraction process 24B of FIG. 7, when it is applied to the field 800 shown in FIG. 8. The field mark coordinates 406 are shown as X1,Y1 and X1,Y2 in Table 1. The remaining portion of Table 1 represents the viewpoint structure 408 for the field 800 shown in FIG. 8. The viewpoint structure is divided into the nine regions 1-9 shown in FIG. 8 and sequentially set forth in Table 1. Region 1 shows a viewpoint primitive type as box end 1 and that corresponds to the box end 820 of FIG. 8. The coordinates for the corner of the box end 820 are X11,Y11 and are also included in Table 1.

Region 2 is set forth in Table 1 with two viewpoint primitives, the first one is a blob type and the second one is a line type. For the first viewpoint primitive, the text 810 is characterized as a blob type viewpoint primitive and a circumscribing box is defined for a blob type primitive as described below. The coordinates of the circumscribing box are included in the region 2 blob viewpoint primitive definition. The second viewpoint primitive for region 2 is a line type and its coordinates are also given. The line viewpoint primitive is 822 in FIG. 8.

Region 3 has a box end 2 type viewpoint primitive 824. Region 4 has a line type primitive 826. Region 5 has a box end primitive 828. Region 6 has a line type primitive 830. Region 7 has a box type primitive 832. Region 8 has a line type primitive 834. Region 9 which is inside the marked box 812, has nine viewpoint primitives, four viewpoint primitives are box end types for the box 804. One viewpoint primitives is a line type primitive for the line 808. Four additional viewpoint primitives are box end type primitives for the box 806. These all correspond to region 9.

Table 1 is constructed by the process carried in the flow diagram of FIG. 6 which identifies and constructs for each defined field by the user, the corresponding viewpoint structure. If the process to create the form definition data set of FIG. 6 is applied to the field 800 shown in FIG. 8, the result would be the field extraction information 404 represented by Table 1 with the coordinates 406 for the marked area and the viewpoint structure 408.

When a form which includes the field 800 is scanned into the system for the purpose of performing character recognition on the filled-in information within the box 800, the forms recognition and field extraction process of FIG. 7 will get the form definition data set 400 represented by Table 1 and will perform the field extraction operation using the definitions of Table 1 to extract the portion of the field within the box 812 in FIG. 8.

Field Image Filtering Method (or FIFA)

Introduction

One of the key function in the Extraction Recognition Process is the extraction of potential valid field data. The key question to be answered is what is the "potential valid field data".

In general, the data that are intentionally entered into a specified field area in a form document are the "valid field data". Unfortunately there may be un-intentionally intruded data appearing in the same specified area that is supposed to contain only the valid data. These un-intentionally intruded data include the excessive data coming from the neighboring fields and the form text or form lines that are in the areas of valid field data.

In addition to the un-intentionally intruded data, there are other scenarios causing the similar problem, which is to be dealt with by the same functional area: extraneous lines or intruded lines removal.

The following is a list of such problems (a list of problem examples are shown in the last section of this document):
- the field area is defined too close to the existing form lines or form background text; the field may even be defined on top of the form lines or form background text.
- the intentional valid data were entered not straight within the field boundary.
- the form image is scanned with a skew or an offset such that the specified field area can not match exactly with the intentional valid field data.
- the excessive data, e.g. the signature tail, of the neighboring field may intrude in the field area.
- the existing lines, boxes, or special patterns in a field needs to be separated and removed from the valid field data.
These existing data are not valid field data.
e.g. the boxes around each number of the social security number field, the '(', ')', and '-' in the telephone number field, and the '/' and ':' in the date and time fields, etc.

In addition to the above problems, there are also other problems regarding the language associated characteristics such as:
- the accented Latin characters have separated parts in one character, which has to be captured together with the main part. This is especially important when the main part is in the user-specified field area and the separated part is outside the user-specified field area. e.g. the '.' in the 'i' or the '.' in '!'.
- the Far-East Ideographic characters are mainly composed of many separated radicals. These characters have the similar but more serious problems than the problems in the accented Latin characters.

The Field Image Filter Method described in the following sections intends to solve the these problems.

---
The Algebraic Background
---

$F = ( M, \{ Rn \mid n = 0, ..., N - 1 \} )$ where

F  is the field
M  is the field mark, which is used as the COORDINATE sets
Rn is the relation between viewpoints, which is used as the VALUE sets s (or skew) is a real (or R) representing the rotation shift of an image from their reference direction.
t (or offset shift) is a vector (or V) of 2 integer elements representing horizontal and vertical shift of an image object from their reference coordinates.

\# is an field adjustment function which only adjusts the VALUE (or Object) sets.

NOTE: it may be necessary to have operations to transform
        the coordinate systems; but for now, only the VALUE sets
        are adjusted.

\#: ( F, R, V) ---> F

- is an subtraction function that result in the difference between two field images

-: ( F, F)  ---> F for a master field f0 and a field in the input form f1,
the input form has a skew, s1, and an offset, t1, fx  =  f1 - \#(f0, s1, t1) - fe where fe is a an extraneous image objects based on a set of axioms
       that define what is extraneous data in a field fx is the output field image, the output objects in fx
       will have the same coordinates as the input image, f1.

---
Representation Languages:
---

Coordinate Sets:

Field Mark: an ordered list of vertices:
      < (X0, Y0), (X1, Y1), ..., (Xn-1, Yn-1), (X0, Y0) >

Value Sets (or Image Object Primitives):

Viewpoint:

Dot:  A group of connected pixels isolated from other
            group of pixels.

Line ends: The ending image object of a horizontal,
                 vertical, or oblique lines.

Box ends (or L ends): The corner of two lines forming
         an 'L' pattern the corner in one of the four
         direction.

Crosses (or X ends): Two lines crossing each other in
         either upright or 45-degree direction V ends: Two lines forming 'V' pattern in one of four
         directions.

T ends: Two lines forming a 'T' pattern in one of
         four directions.

BLOB: A group of short runs in a certain area and none
      of the runs are qualified as a line.

Others: To catch all the rest of un-categorized patterns.

ViewRelation:

A pair of beginning viewpoint primitive and ending
viewpoint primitive.

---

Representation Axioms:

---

(1) all pixels group that has no qualified lines are
    categorized as an image blob which is represented by
    its circumscribing rectangle.

(2) all lines will be represented by a beginning and an
    ending primitives other than BLOB and Others.

(3) a line may consist of a series of ViewRelations.

(4) the intermediate viewpoints and/or ViewRelations of a
    line can contain any type of primitive viewpoints.

(5) the ending viewpoints of a ViewRelation can be any
    one of the viewpoint primitives.

(6) the field mark boundary is represented by a series of
    vertices.

NOTE: there may be more than 4 vertices in the field
          mark, but 4 is the default and may be good enough
          for most of the cases.

(7) every primitive will have their own associated functions.
    e.g. The field mark boundary has functions to determine
         whether it is inside or outside.

---

Adjustment Axioms:

---

(1) the field mark will be used as the coordinate sets.
    All the spatial reference will be based on the coordinate
    system. The similarity or validity measurement of an
    image object will be based on this coordinate system.

(2) skew is a real tangent value of the rotation angle relative
    to the image page center.

(3) new viewpoint location is calculated based on its exact
    skew number.

(4) new viewpoint location is shifted based on the input
    offset (5) when two image objects are compared, only the image objects (or value sets) are adjusted to measure their similarity.

(6) because the BLOB is represented by its circumscribing rectangle, the runs or image objects will be adjusted and tested on the reference rectangle in the coordinate system.

---
Extraneous Data Axioms:
---

(1) a single ON pixel surrounded by all OFF pixel is an extraneous data (2) any pixel that is outside of the circumscribing rectangle of the adjusted OUTER field mark is an extraneous data.

(3) the BLOB in the input image that is similar enough to the viewpoints in the Field Viewpoint Profile is an extraneous data.
(See Similarity Measurement Axioms for details about "similar")

NOTE: There is one advantage of this approach regarding this axiom. Because the Phase 0 process has tried to record all the surrounding image data that is not supposed to be the valid data between the inner and outer field mark.

When the circumscribing rectangle of the inner field mark is not skewed too much, the surrounding extraneous data will be automatically dropped. However, if the input form is skewed too much and the surrounding extraneous data is captured, it will be included in the Field Viewpoint Profile and can be recognized as an extraneous data based on this axiom.

Also see the Adjustment Axiom #(6).

(4) any run longer than a minimum line segment is extraneous data (5) an isolated BLOB or Others is an extraneous data if it is much more closer to the invalid data area than it is to the valid data area.

(6) a viewpoint that touches the maximum field outer mark is an extraneous data and the extension of these viewpoints into the valid data area is also considered extraneous line.

(7) a linearly connected set of viewpoints forming a line that is longer than the minimum line segment threshold is also an extraneous data.

However, if some parts of the lines are overlapping with other pixels that may be part of the valid data.
   These parts will be kept as valid data.

(8) any valid data going into the extraneous BLOB (and/or Others ) viewpoint will be considered extraneous data.

---
Similarity Measurement Axioms:
---

(1) similarity measurement is based on the individual primitives considering the skew and offset adjustment.

```
Line ends:      done through pattern table

Box  ends (or L ends): done through pattern table

Crosses (or X ends):   done through pattern table

V ends:                done through pattern table

T ends:                done through pattern table
```

Blobs: The similarity measurement of two blobs will be
       based on the relative center location of the
       Blobs to the inner field mark center and the data
       inside the representative circumscribing rectangle.

The similarity measurement score is the percentage
       of the overlapping between the input image and the
       Blobs in the Field Viewpoint Profile.

Others: The similarity measurement of two Others is default
        to be LOW and potentially requires more detailed
        processing.
        ( it can go down to more lower level field image
          analyses if necessary.)

(2) similarity measurement is used to qualify and categorize
    image objects through the representation of viewpoint and
    ViewRelation.

(3) all the viewpoints and ViewRelations associated operations
    such as interpolation and the removal of the intermediate
    pixels of a ViewRelation is to trace the image object
    having high similarity measurement with the viewpoints on
    one or both ends of the ViewRelation.

---

Figure 9:
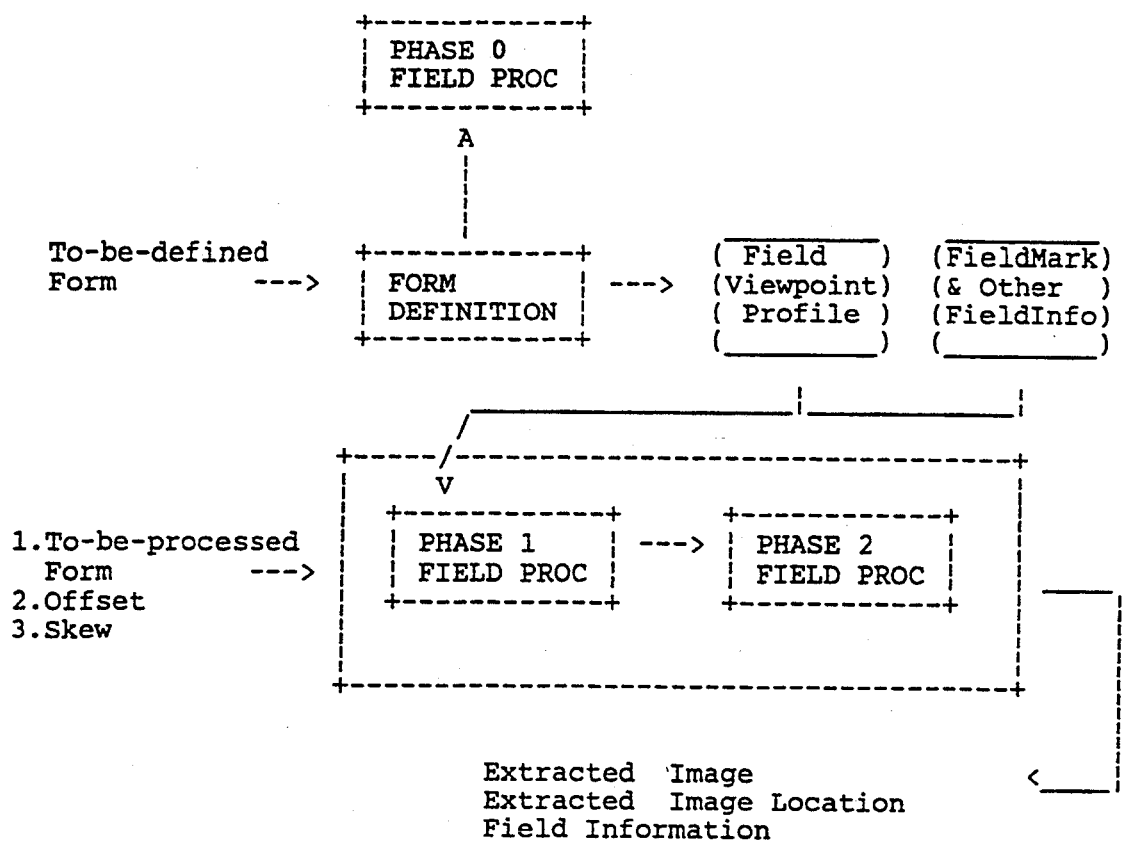
FIG. 9 shows the solution architecture.

Solution Architecture: See the block diagrams of Fig. 9.

---

NOTE: 1. To-be-defined form is a form that is used by the user to
         point out where the field is. It can also be called
         master form.

2. To-be-processed form is a recognized form as one of the
         pre-defined form type and the form's information has
         been pre-stored in the database. The form information
         includes name and/or identifier, type class, field
         identifier, field location, and other field
         characteristics.

3. Offset: the horizontal and vertical shift of the
         to-be-processed form relative to its corresponding
         master form.

4. Skew: the rotation shift of the to-be-processed form
         relative to its corresponding master form.

---

Solution Procedures:

---

(1) PHASE 0 Field Processing

1. Obtain the field mark entered by the user:
      called inner field mark

USER INTERFACE:

(A) user can use mouse or keyboard to select the field
          to be extracted (B) user can choose to erase the existing data inside the field mark or NOT
(C) user can choose to erase or to keep partial existing data inside the field mark.

2. Create two histograms and the associated runs list for the MAX_FIELD_GROWTH area.

-- determine the majority line width
   -- determine the minimum line segment length
     1. default MIN_LINE_SEGMENT_LENGTH
     2. twice the average width of the FAT segment in the histogram.
        (a FAT segment is a peak or a valley higher than a threshold and 3 times fatter than the majority line width:
        why 3 times? an average width of a character is at least about 3 times wider than its stroke )

3. Create the outer field mark.

-- use the histogram to determine the outer field mark. The outer field mark is the outer boundary of the valid field data.

NOTE:
   (1) the outer field mark will allow some degree of form skew or user error in data entry to happen and still capture the correct valid field data.
   (2) The minimum distance between the inner field mark and the outer field mark depends on the requirement on the tolerance of the skew.

INNER_OUTER_DISTANCE_V =
       tan( degreeOfSkewTolerance ) * field_length.

INNER_OUTER_DISTANCE_H =
       tan( degreeOfSkewTolerance ) * field_width.

4. Use the two histograms and the associated runs list to determine the following viewpoints:
   - lines: horizontal, vertical,
   - boxes: box ends connected by lines
   - 'L', 'V', 'T' shape views with at least one leg longer than MIN_LINE_SEGMENT MARK the runs with its associated viewpoint identifier.

5. Use the two histograms and the associated runs list to determine the BLOB areas using the following delimiters:
   - a block of blank space about 3 times wide and high of the majority runs length.
   - a viewpoints detected in the previous operation.

NOTE: a BLOB area is an area that may be a group of characters, figures, or special patterns that can not be qualified as a line segments or a boxes.

6. Establish the ViewRelation for the viewpoints identified.

NOTE: a ViewRelation is a structure that define the relationship between two viewpoints.

7. Create the field viewpoint profile structures and prepare for its storage format.
8. Store the Field Viewpoint Profile into database. (and other field information)

NOTE: a Field Viewpoint Profile (or FVP) is a list of viewpoints and ViewRelations identified for a field.

(2) PHASE 1 Field Processing

1. Obtain the to-be-processed image, offset, and skew
2. Retrieve the Field Viewpoint Profile from the database (and other field information)
3. Scan through the ViewRelations and the Viewpoints in the Field Viewpoint Profile
   -- copy the image data within the circumscribing rectangle of the adjusted OUTER field mark from the original image to the working memory.

NOTE: Extraneous Data Axiom #(2).

-- based on the offset, the skew, and the new working memory coordinates.
      * adjust the location of all viewpoints NOTE: during the adjustment, the adjusted location of the viewpoints in the Field Viewpoint Profile can be used to verify with the to-be-processed form.

the viewpoints and the interpolated area of the viewpoint will be adjusted based on the input skew and offset.

4. Erase (mark its status to YES_ERASEIT) the runs that are outside the outer field mark.

5. Erase the BLOB views that match the corresponding adjusted BLOB views obtained from the Field Viewpoint Profile.

This process will erase the blobs outside the inner field mark by erasing all pixels that are beyond the adjusted rectangle boundary (see Adjustment Axiom #(6)) and erase the blobs inside the field mark by erasing all pixels that are inside the blob's adjusted circumscribing rectangle.

This process needs to detect if there is any other viewpoint intruding into the to-be-erased pixel blob. Use the similar approach in Step 5 of this phase to keep the portion that is the extension of the intruding viewpoints.

At this step it is to keep the interpolated pixels and the next step is to erase the interpolated pixels.

NOTE: a. use the BLOB views in the Field Viewpoint profile as the starting point.
         b. adjust the BLOB area based on the input skew and offset.
         c. tracing around the adjusted pixel blob area and see if any viewpoint intruding into the area.
         d. determine the intruding viewpoint type.
         e. find the viewpoint on the other side of the pixel blob area.
         f. keep the values in the interpolated area and erase the rest of pixels in the blob that is included in the Field Viewpoint Profile.

6. Based on the stored viewpoints and the ViewRelations and the adjusted viewpoint locations, remove the ON pels that match the Viewpoints and the ViewRelations in the Field Viewpoint Profile.

NOTE:
         1. there may be some other viewpoints that intersect the existing ViewRelations and viewpoints.
            ==> only erase the portion of the intersecting viewpoints that match the to-be-erased viewpoints.

2. it is also possible that the existing viewpoints
   are missing.
   ==> verify that the rest of the ViewRelations and
       the viewpoints are very SIMILAR to what is
       defined in the Field Viewpoint Profile.
       The missing viewpoints can be assumed and
       process the existing erasable views as usual.

Figure 10:
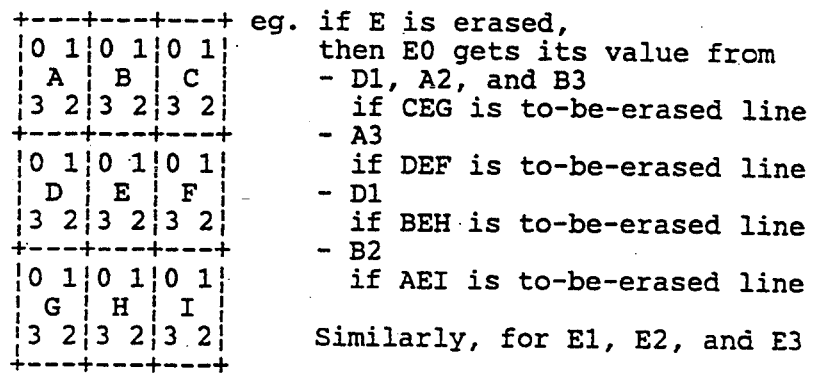
FIG. 10 shows strange viewpoints.

The Viewpoints, called STRANGE_VIEWPOINT, that do not
match the viewpoint in the Field Viewpoint Profile will be
processed as follows:
A. Follow the same trend as the Viewpoints that match
   the viewpoints in the Field Viewpoint Profile and find
   a viewpoint that also match the viewpoints in the
   Field Viewpoint Profile beyond the other end of the
   STRANGE_VIEWPOINT.
B. Erasing the interpolated Viewpoints that match both
   viewpoints on the two ends of the STRANGE_VIEWPOINTS.
   The erased cells will be filled with the extended
   patterns of the surrounding cells.  See Fig. 10.

(3) PHASE 2 Field Processing

1. Create Histograms and runs list for image rows and image
     columns for the rest of the image data.

2. Scan through the histograms and runs list to
     -- create viewpoints and ViewRelations for the rest of
        the pels that may be part of a line or a box.
     -- mark the status of the runs and viewpoints along the
        process.
     -- identify the pixel blobs.
        Analyze the histograms and the runs list to determine
        the rest of the image data and categorize them as
        BLOB viewpoint type.

3. Check the Viewpoint and BLOB status
     -- if it is isolated and outside the inner field mark,
        check its distance against the Outer and inner field
        marks or valid data.
        Locate the isolated pels groups (or blobs) that is
        outside the inner field mark.
     -- if the center is on the other side of adjusted OUTER
        field mark, ERASE it.
     -- if a continuous series of ViewRelations are linear
        or pseudo linear, compute its length.
        = to detect any line that is longer than a MINIMUM
          LINE SEGMENT.

4. Erase
     -- the runs that contribute the qualified lines:
        vertical, horizontal, oblique lines
     -- the Viewpoints that score lower than the GOOD data
        threshold.  The Extraneous Data Axioms are used as
        the criteria to score the image objects.
        e.g.
        *  it is a single pixels and isolated from other pixels
        *  it is much closer to the outer field mark    or
        *  it is much closer to the viewpoints in the
           Field Viewpoint Profile.

5. Output the outer field mark as the field boundary and
     the resulting image.

NOTE: it may need to squeeze the outer field mark to
           circumscribe the final extracted field image.

```
-----------------------------------------------------------------
Problem examples to be solved:
 UPPER CASE: the background text
 lower case: the to-be-retrieved text
-----------------------------------------------------------------
```

Figure 11:
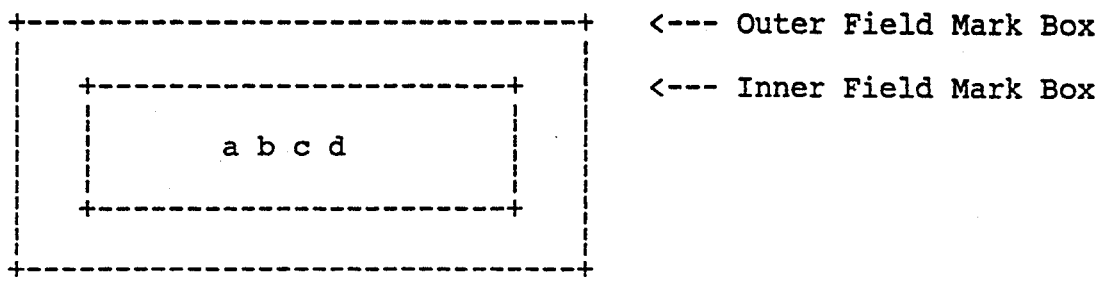
FIG. 11 shows the perfect case.

(1) Perfect case (NOTE: this is not a problem but an ideal case
    for a field data.  We will not need any process if we can
    be guaranteed that all field data will be like this case. )
    See Fig. 11 for the perfect case.

Figure 12:
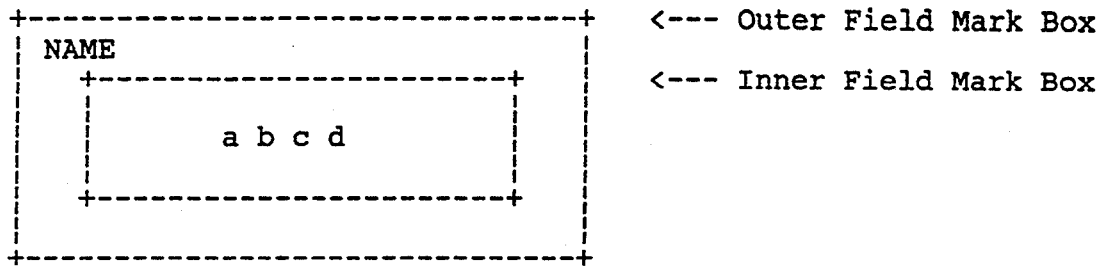
FIG. 12 shows the background text case.

(2) background text in the field's existing outer viewpoints
    See Fig. 12 for the Background Text case.

Figure 13:
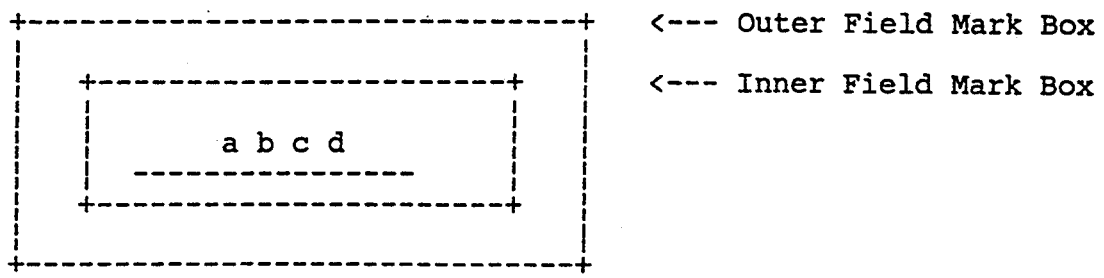
FIG. 13 shows the case of a line in the field's existing inner viewpoint.

(3) See Fig. 13 for line in the fields existing inner viewpoint.

Figure 14:
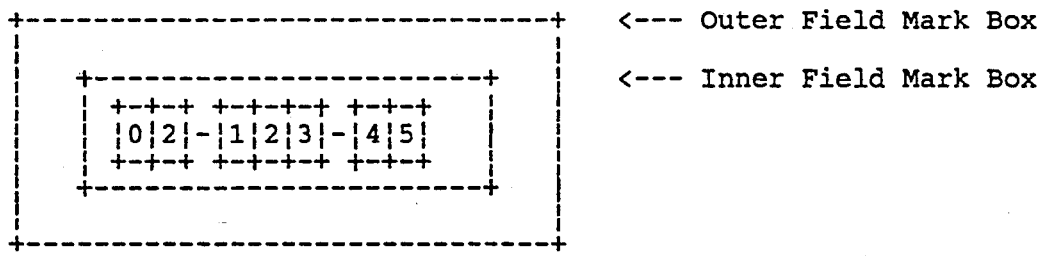
FIG. 14 shows the case for lines forming boxes in the field's existing inner viewpoint.
Figure 15:
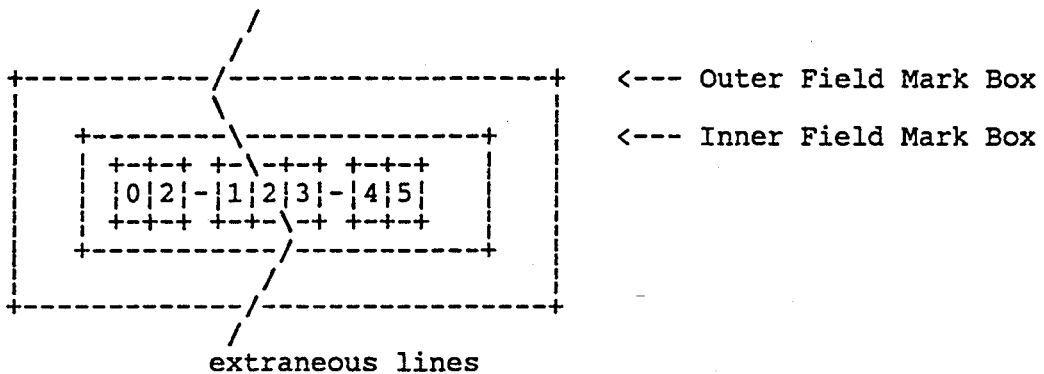
FIG. 15 shows the case for non-straight lines crossing the field.
Figure 16:
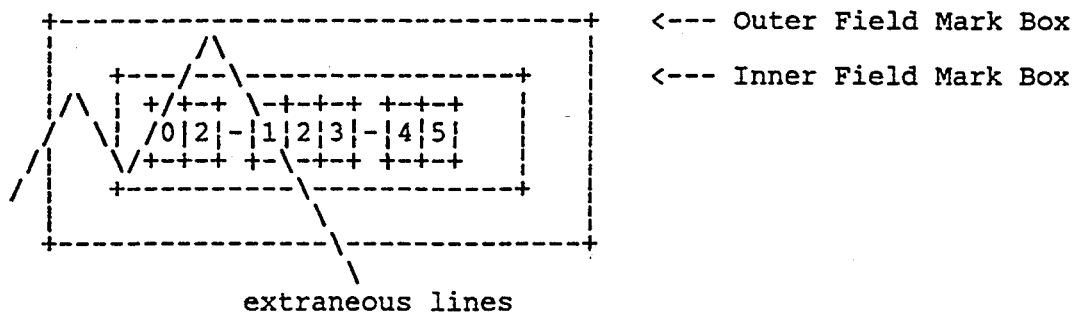
FIG. 16 shows the case for non-straight lines crossing the field in another example.

(4) See Fig. 14 for lines forming boxes in fields existing inner viewpoint (5) See Fig. 15 for non-straight lines crossing the fields   --- A (6) See Fig. 16 for non-straight lines crossing the fields   --- B (7) This happens if the vertical line is not long enough to actually
    go outside of the MAX GROWTH boundary or there is a break at the
    MAX GROWTH boundary.  See Fig. 17 for long lines case.

(8) the lines or boxes of a form inside the field boundary may need
    to be removed.
    -- This capability will allow the following social security field
       to be reasonably defined as one field.  See fig. 18.

-- the background text, See Fig. 19

-- the background symbols like '-', '......', '(', '/', etc.
       See Fig. 20

Figure 21:
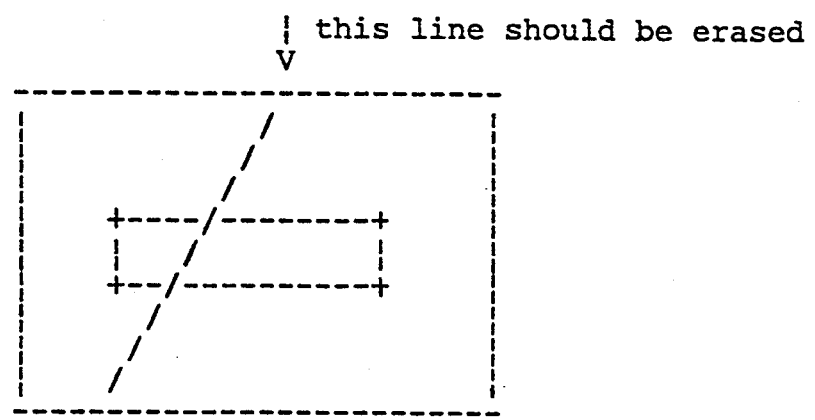
FIG. 21 shows the case of an oblique line crossing the inner field mark.

(9) Oblique line crossing the inner field mark
    See Fig. 21.

Figure 22:
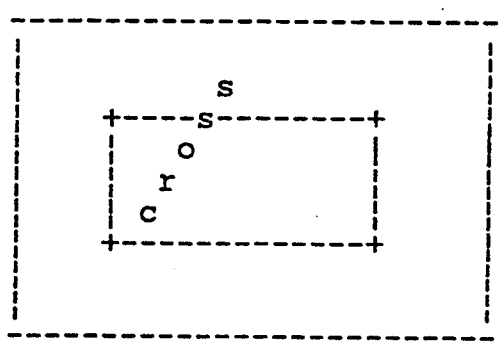
FIG. 22 shows the filled in data which goes beyond the inner field mark.

(10) The filled-in data go beyond the inner field mark
     See Fig. 22.

Figure 23:
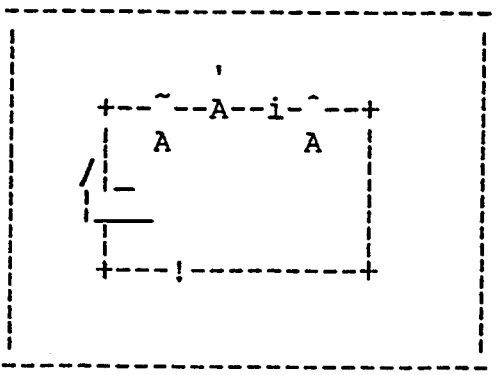
FIG. 23 shows the case of accepted characters and the separated radicals in a character.

(11) The accented characters and
     the separated radicals in a character
     ( here A is valid data to be captured in the output image)
     See Fig. 23.

---
Processes:
---

(1) Viewpoint cell width and height detection

For any area that consists of a set of pixel runs, the area's characteristics can be represented by the organization or the relationship among the meaningful grouping of the pixels.

Here the meaningful grouping of pixels is called the viewpoint.

A viewpoint is made up of 9 cells of which the width and the height need to be adjusted to the majority run length of the data in the image fields.

The majority horizontal run length is used to be the cell width and the majority vertical run length is used to be the cell height.

The majority run length can be determined using the sampling and sorting processs described as follows:

1. Sampling:
       a. determine the sampling levels needed for the area
          e.g. 8 levels or 16 levels
       b. sample the run length of each run into one of the
          levels determined in a.

c. count the number of runs in each level (or category).

2. Sorting: use quick sort to sort the run levels based on its number of runs in that level.

3. The Majority Run Length is the run length level which has the most number of runs in that level or category.

4. Use the above 1, 2, and 3 steps for both horizontal runs and vertical runs to determine the cell width and cell height.

(2) Viewpoint evaluation

See Figure 24 for Viewpoint Structure.

a. Obtain the viewpoint cell width and cell height
    b. Use the horizontal and vertical histograms to select the potential viewpoint locations:
       the location where the horizontal run length is longer than the cell width and the vertical run length is longer than the cell height.
    c. Create a working version viewpoint based on the location selected at step b. The selected location is used for the upper left corner of the middle cell of the top row in the viewpoint. i.e. the B0 location in figure 1.

It is very straight forward to use the location and the cell width and cell height to compute the dimension of every cell and sub-cell.

d. Score each sub-cell and see if the sub-cell is 0 or 1 using one of the following approaches:
       There are several alternatives to score each sub-cell:
       - just count the ON pixels
       - count the ON pixels that connect to at least one (or two for more strict case) other pixel.
       - the sub-cell with a score higher than a default threshold value will be considered to have a value 1; otherwise, it will have a value 0.

NOTE:
   In the case of ambiguity or the case that needs further
   processing to recognize a viewpoint:

Two types of further processing:
   NOTE: Expansion may be better for FIFA processing and
         Explosion is better for recognition processing.

Type 1: Expansion 1. to expand the areas to 3 times as large as the current
      size in each direction.

The cell width is the original viewpoint width.

Type 2: Explosion 2. to subdivide the current viewpoint into 3 x 3 smaller
      viewpoints.  i.e. to make each viewpoint cell itself
      an individual viewpoint and evaluate them.

e. Based on the score of each sub-cell of the working version
   viewpoint, the viewpoint type can be identified and the
   neighboring viewpoints can be further explored.

==> Create a ViewRelation list when the viewpoint type is
       identified.

e1. if no ViewRelation exists,
           ==> create the new ViewRelation
       e2. if a ViewRelation list exist
           ==> From the ViewRelation list, check if
               the new viewpoint is a continued extension
               of the existing ViewRelation,
               YES: update the ViewRelation to include the
                    new viewpoint
           NO:
               1. Finish up the existing ViewRelation if
                  the new viewpoint is not an extension
                  of the existing ViewRelation.
                  - if the ViewRelation is not long enough
                    to become a line segment and they are
                    connected or close enough to a BLOB
                    viewpoint,
                    make it part of the BLOB viewpoint.

2. Create a new ViewRelation starting with
                  the new viewpoint.

f. Repeat this process from step b. to step e. until no
   runs in the area of the field is found.

g. When the field has been totally processed, the field is
   represented as a ViewRelation structure.

e.g. for a box type ViewRelations See Fig. 25

(3) ViewRelation growing a. Scan through the existing viewpoints and ViewRelations.
   b. Analyze the relationship between these viewpoints and
      ViewRelations based on their geographical connection
      relationship through the 8 outer cells.
      - record the isolated viewpoints as a separate ViewRelation
      - record the beginning and ending viewpoints in the
        ViewRelation and do not record the intermediate viewpoints
        if the two viewpoints are connected by a series of similar
        viewpoints.
   c. Sort ViewRelations from left to right and from top to bottom.

d. NonStraightLine detection
- When a series of connected ViewRelations forming a "linear connection" from one ViewRelation to another ViewRelation, it can be viewed as a non-straight line.

A straight line can be represented by one ViewRelation with a beginning viewpoint similar enough to the ending viewpoint.

What is "linear connection" is that any one of the connected viewpoint has connected to at most only two other viewpoints.

e.g. see Fig. 26A

LINEAR: every viewpoint connects at most 2 other viewpoints.

e.g. see Fig. 26B

NOT LINEAR:

NOTE: if the line between V2 and V4 are not longer the the MIN_LINE_SEGMENT, it is pseudo linear.
** this MIN_LINE_SEGMENT can be defined as at least 3 times of the cell width of V.

(4) Viewpoint type identification

1. Start from the cell width and cell height.

2. Create a 3 cells by 3 cells of working viewpoint block and score its cell and sub-cell value.

2. Any of the block can be categorized as one of the primitive types in this FIFA process using the 512 bytes of PATTERN TYPE TABLE (or DIRECTION TABLE).

Using a pre-defined pattern type table, we can basically determine the direction and its external contact locations for the viewpoint block.
The direction of the combined two neighboring blocks can be easily determined.

```
Byte 1               210
Byte 2          210         <<---- shifted left 3 bits
Byte 3     210              <<---- shifted left 6 bits
-----------------------------------
Combined address
for direction
table              ********
```

The value of the pattern table is the primitive viewpoint type.

The table will be set up such that the similar pattern will be assigned to one of the following primitive pattern type. See Fig. 27, which shows examples of

LINES:

CORNERS: namely, 'V' and 'L' types

CROSSES: namely, 'X' and 'T' types

BLOBS: others (5) Oblique (or diagonal) line removal process a. Determine the sub-cell values of each cell that is in the cells on a to-be-erased line.

b. Leave the OFF sub-Cell value alone c. For an ON sub cell value, check its surrounding sub-cell of
   the neighboring cell to copy their majority value to the
   to-be-erased sub-ell.

NOTE:
   1. the surrounding sub-cells do not include the sub-cells
      of the cells in the to-be-erased viewpoint.
   2. An alternative method to determine if the pixels in a
      sub-cell should be erased is to check:
      ===> for the cell that are to be erased, go check
           the runs in that cell.

If the runs go outside the cell, keep it.
           Otherwise, erase it.  See Fig. 28

(6) Insider Verification

Figure 29:
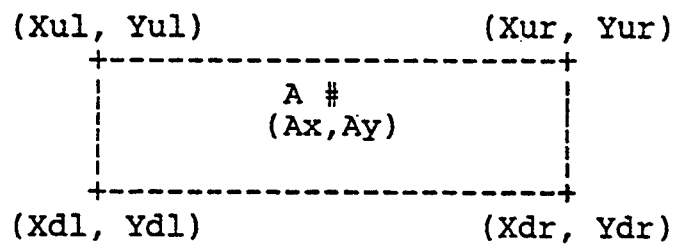
FIG. 29 shows an example of inside verification given a rectangle, a skew and an offset.

NOTE: this can also be used to verify if a run is in a specified
         viewpoint cells.

a. given a rectangle, a skew, and an offset, as in Fig. 29,
      to test if a runs, a pixel, or a group of pixels are inside
      the adjusted rectangle.

options:
      - erase the insider:
      - erase the outsider
      - output the insider $A'(A'x, A'y)$  ===> to be adjusted
                              $* <R, M>$           to $\#(Ax, Ay)$ or
                                                   $\#<R, M - N>$ $<R, M>$: R is the radius, M is the angle
      $<R, M-N>$: N is the rotation angle
      o:  rotation origin:  given $A'$, to test if the adjusted
                            A is an insider ===> TO DETERMINE IF $\#(Ax, Ay)$ is inside the field mark b. if skew is 0,  Offset: (Ox, Oy)

INSIDE:   $Xul <= Ax - Ox <= Xur$   AND
                $Ydl <= Ay - Oy <= Yul$ where    Xul = Xdl, Xur = Xdr, Yul = Yur, Ydl = Ydr c. if skew is D degree $(\tan(D) = s)$ and
      $s <> 0$, Offset: (Ox, Oy)

- rotate the object -s
      - shift the object (-Ox, -Oy)
      - test if it fits in the rectangle NOTE:
           for 10 degrees skew
           400 dpi of 14 inches paper: 5600 pels in a line ===>  $5600 * \sin(10) : 972$
                 $5600 * \cos(10) : 85$ ===>  create a table based on the maximum tolerance
                 of 10 degrees skew; each entry of the table is
                 to get an integer value for the maximum skew
                 tolerance.  The value is the real value of
                 $\sin()$ and $\cos()$.

-- 100 entries for cos
-- 1000 entries for sin

==> table format:

TABLE A:

| tan() | cos() - 1 | degree |
|-------|-----------|--------|
| 0.0017 | 0 | 1/10 |
| 0.0034 | 0 | 2/10 |
| . | . | . |
| 0.158 | -0.012 | 9 |
| . | . | . |
| 0.176 | -0.015 | 10 |

TABLE B:

| tan() | sin() | degree |
|-------|-------|--------|
| 0.00017 | 0.00017 | 1/100 |
| 0.00034 | 0.00034 | 2/100 |
| . | . | |
| . | . | |
| 0.17 | 0.17 | 10 |

INSIDE:
    Xul <= Sx + Ax - Ox <= Xur    AND
    Ydl <= Sy + Ay - Oy <= Yul where given M: the angle of the to-be-totated location
           i.e. A'(A'x, A'y)
         N: the delta angle of rotation
         R: $(x^2 + y^2)^{1/2}$ sin(M) = A'y / R
         cos(M) = A'x / R Sx = R ( sin( M - N) - sin(M) )
      = R ( sin(M)cos(N) - cos(M)sin(N) - sin(M))
      = R sin(M){ cos(N) - 1} - R cos(M)sin(N)
      = A'y * { cos(N) - 1} - A'x * sin(N)
      = A'y * TABLE_A(N) - A'x * TABLE_B(N)

Sy = R ( cos( M - N) - cos(M) )
      = R ( cos(M)cos(N) + sin(M)sin(N) - cos(M) )
      = R ( cos(M){ cos(N) - 1} + sin(M)sin(N) )
      = A'x * { cos(N) - 1} + A'y * sin(N)
      = A'x * TABLE_A(N) - A'y * TABLE_B(N)

(7) Outer Field Mark Boundary generation

A. if no runs between the inner field mark and the default
      maximum field boundary, use the default maximum field
      boundary.

B. compute the runs density for each image row starting
      from the inner field mark and growing outward:

(summation of runs length / area dimension)

if the density is greater than 50% and its distance to
         the inner field mark is greater than the minimum
         pattern size.

Figure 30:
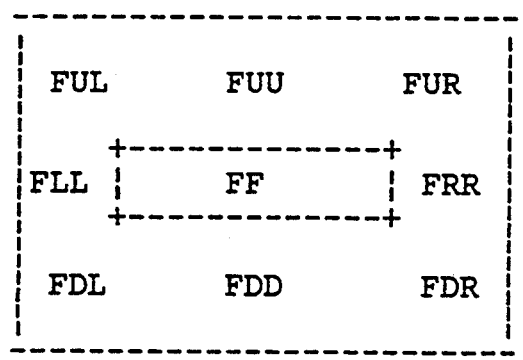
FIG. 30 shows outer field mark boundary generation.

NOTE:
1. this can be made to record a more-than 4 edges of outer field boundary if the area that is used to computer the density is a smaller segment than the whole field dimension.
2. the horizontal area dimension is obtained by the row histogram and the vertical dimension is obtained by the column histogram in each of the surrounding sub-areas of the inner field mark. See Fig. 30.

3. The above figure shows the sub-areas in a field, in which its corner sub-areas ( FUL, FUR, FDR, and FDL) will be individually processed to identify the area dimension of the outer field mark.

C. do it for four sides and four corners of the inner field mark.

(8) Linear Line Detection and Length Measurement

A. Scan through the ViewRelations.

B. Find a beginning viewpoint of a line.

C. Trace the ViewRelations that connect to the beginning line end.

D. Until no more ViewRelations are connected to the growing line.

F. Compute its length: total number of cells the line has gone through.

Non-straight Lines Tracing Process

1. Problem Description

In an image processing environment, there often are situations that have to trace a non-straight line across the image. During the tracing, the target line may be intersected by several line segments from other directions. The problem to be solved is to make the best choice to proceed at the intersection point where multiple line segments meet together.

Figure 31:
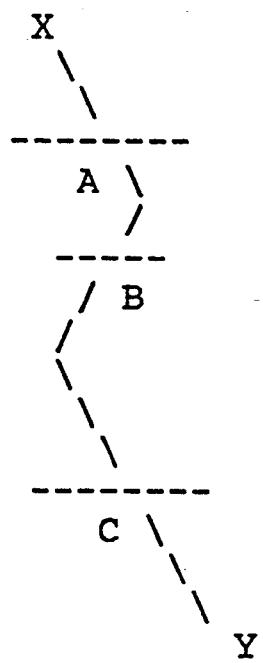
FIG. 31 shows an example of non-straight line tracing.

For instance, the following figure shows that A, B, and C are points that the straight line is intersecting with the multi-segment line. The problem is to trace the multi-segment line from point X to point Y and to capture all pixels that belong to this line. e.g. See Fig. 31.

Figure 32:
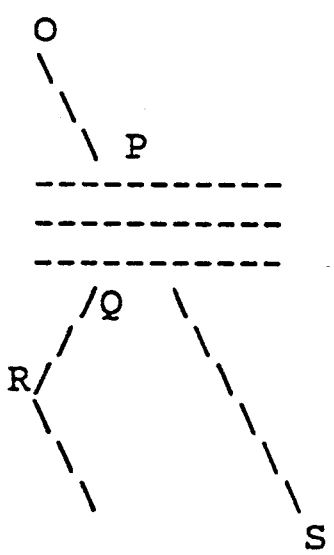
FIG. 32 shows an example of a split line.

The following figure shows that, at point Q, the line, OP, has split into two branches after being intersected by a horizontal line (with width of 3 pixels). The intent is to allow the tracing process to proceed following QS path. See Fig. 32.

2. Background

The background of solving this problem is that a bit map raw image is used as the input and a sequence of steps are used to locate the continuous ON pixels. The continuous ON pixels which is called "run" are recorded with their starting location and ending location. This process can be done in both horizontal and vertical directions to locate the horizontal runs and the vertical runs.

A run is a group of contiguously connected ON bits on the same row or on the same column.

A line is a contiguously connected runs meeting the following
requirements:
-- the line width is the run length of the majority runs in this line.
-- the number of runs of which the length is equal to the line width
   must be greater than twice the line width.
-- for those runs that are connected to the line and are longer than
   the line width, the pixels that are one half of the line width
   beyond the line boundary are not considered part of the lines.
-- for those runs that are connected to the line and are shorter than
   the line width, the OFF pixels at both run ends or in the middle
   will be considered part of the line.
-- a run connecting to the line means that the run overlaps the line
   by at least more than one half of the line width.

There are two key data structures for the processing of these runs
and the lines to be traced, which are called Run and Line.
In Run and Line, the beginning and ending coordinates of
the object and the states of the object are recorded for the tracing
process.

For the purpose of describing the line tracing process, let's use
the following structured information:

```
Line
    .width             <--- the majority run length in this line
    .begin             <--- the beginning row (or column in vertical run)
                            of the line
    .end               <--- the ending row (or column in vertical run)
                            of the line
    .runList           <--- a list of orderly Run structure in a line
    .minArea           <--- the lower boundary of the growing area
    .maxArea           <--- the upper boundary of the growing area
    .slope             <--- the slope of the last segment of the line
    .lastSlopeBegin    <--- the beginning row of the last segment that
                            has different slope than the previous segment
Run
    .begin             <--- beginning position of the run
    .end               <--- ending position of the run
    .flag              <--- ORIGINAL or FIXED_TO_LINE
```

3. process

Figure 33:
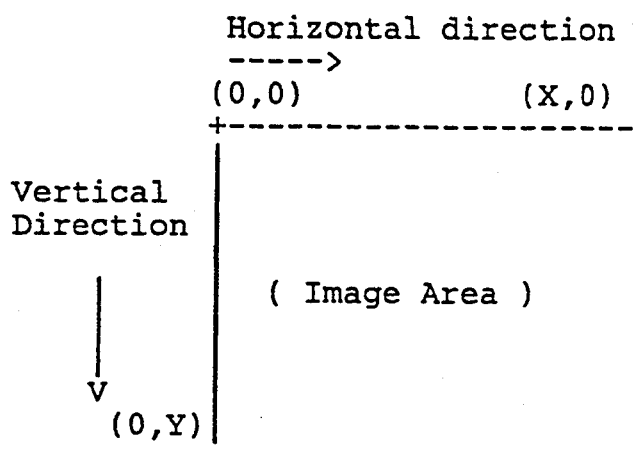
FIG. 33 shows an example coordinate system.

Assumptions:
   A. This process will focus on the line composed of horizontal runs.
      The line composed of vertical runs will be done similarly.
   B. The coordinate system is assumed as shown in Fig. 33.
   C. The tracing direction is from top to bottom.

Step 0: Assumed that the preprocessing has detected that a line exists.
           The purpose of this process is to trace this line and found
           all pixels that belong to this line.

Figure 34:
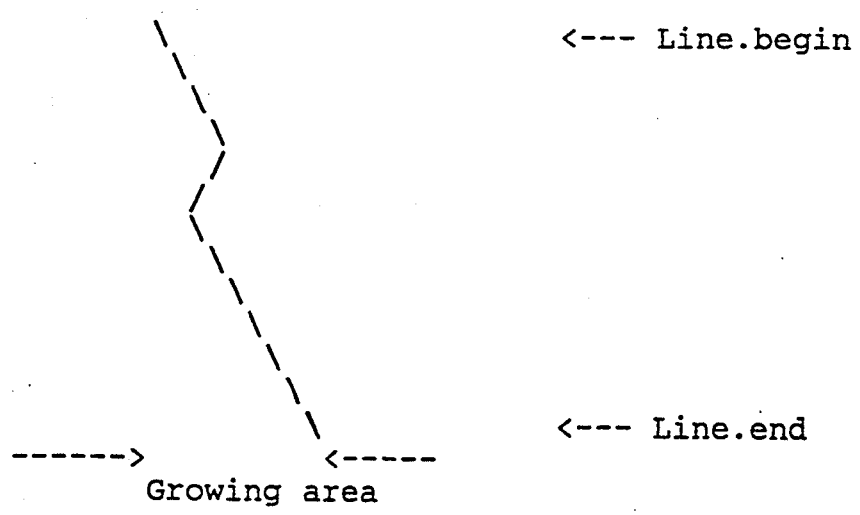
FIG. 34 shows an example of a growing area for a line.

Therefore, the line structured is populated with the following
           values:

Line.width
               Line.begin
               Line.end
               Line.runList
               Line.minArea
               Line.maxArea
               Line.slope
               Line.lastSlopeBegin Step 1:
           The range of the area from Line.minArea and Line.maxArea is
           called the "growing area". In the case of horizontal runs the
           growing area is actually the most left and the most right
           boundary of the line now being traced),
           e.g. See Fig. 34.

Starting from the row next to the Line.end within the growing area, record all runs that at least connect to the growing area by one pixel.

Step 2:

Check if more than one runs found in Step 1 are all connectd by the last run of the Line.runlist:
If YES, combine these runs into a run called NewRun.
    NO, find a run, NewRun, that connects to the last run of the Line.runlist
       if NOT FOUND, goto Step 5.

Test the last run in Line.runList against the NewRun.

The testing result may fit one of the following cases:

Case 2.1:
  If the NewRun does not connect to the last run in Line.runList at all:

goto Step 5.

Case 2.2:
  If the NewRun satisfies the requirements of a line:
  (as stated in the above Background section)

goto Step 3.

Case 2.3:
  If the NewRun is totally contained in the line:

goto Step 3.

Case 2.4:
  If the NewRun overlaps the last run in Line.runList
  but the run length is much greater than the line width:
  (e.g. more than twice the line width)

goto Step 4.

Case 2.5:
  If the NewRun overlaps the last run in Line.runList but either end of the run extends beyond the corresponding end of the last run in Line.runList by more than the line width:

goto Step 4.

Step 3. Update the Line values using the following formula:
Assumed the run found in the Step 2 is called NewRun.
Assumed the last run in Line.runList is called LastRun.

Line.width
  no change
Line.begin
  no change
Line.end
  increment by 1
Line.runList
  Case 2.1: add the NewRun structure to the Line.runList
  Case 2.2: repeat the last run's structure of the Line.runList
Line.minArea
  Line.minArea = MIN( NewRun.begin, LastRun.begin)
Line.maxArea
  Line.minArea = MAX( NewRun.end, LastRun.end)
Line.slope & Line.lastSlopeBegin Compute a NewSlope using the run in Line.runList at the Line.lastSlopeBegin.

If NewSlope is equal to Line.slope or
   the difference between NewSlope and Line.slope is
   less than a pre-set threshold, break and goto Step 1 for next row.

Otherwise,
   Increment a NewSlopeCount and check.
   If NewSlopeCount is greater than a threshold,
       (the threshold can be fixed or can be set to the
       Line.width)

Line.slope = NewSlope
       Line.lastSlopBegin = currentRow - NewSlopeCount.

Otherwise,
       break and goto Step 1 for next row.

Step 4. Fix the NewRun.begin, NewRun.end, and NewRun.flag values based
on the relationship between NewRun and LastRun.

Check both the following cases and update the NewRun values.

Case 4.1:
   If the absolute value of (NewRun.begin - LastRun.begin) is
   greater than one half of the Line.width:

NewRun.begin = LastRun.begin + slope
       NewRun.flag  = FIXED_TO_LINE.

Otherwise,

NewRun.begin = LastRun.begin.

Case 4.2:
   If the absolute value of (NewRun.end - LastRun.end) is
   greater than one half of the Line.width:

NewRun.end  = LastRun.end   + slope
       NewRun.flag = FIXED_TO_LINE.

Otherwise,

NewRun.end  = LastRun.end.

Update the Line values as follows:

Line.width
   no change
Line.begin
   no change
Line.end
   increment by 1
Line.runList
   add the NewRun structure to the Line.runList
Line.minArea
   Line.minArea = MIN( NewRun.begin, LastRun.begin)
Line.maxArea
   Line.minArea = MAX( NewRun.end, LastRun.end)
Line.slope
   no change
Line.lastSlopeBegin
   no change goto Step 1 to process the next row.

Step 5. Check if it is the first gap encountered.
   If YES, initialize the gap counter.
       goto Step 1 to process the next row.

```
          If NO,  check if the gap count is greater than the broken line
                  tolerance threshold
                  if YES, STOP
                  if NO,
                       set NewRun.begin = 0 and
                           NewRun.end   = 0 goto Step 4.
```

4. Applications

When the process stops at Step 5, the resulting Line structure can
   be used in an application called Remove Extraneous Lines. In an image
   field filtering process, there is a condition which a line coming from
   neighboring field intrudes the field under processing. The intruded
   line can be detected at the maximum field boundary. The purpose of
   tracing the line is to remove it from the field that is currently being
   processed.

Using the above process, a non-straight line can be traced and when
   this non straight line is intersected by other data or line segments
   within the field. The process can keep proceeding to capture the
   rest of the line without damaging the intersecting line segments.
   The technique used to avoid damaging the intersecting line segments
   is to keep the runs of which the Run.flag is FIXED_TO_LINE, whereas
   all runs in Line.runList with the flag value, ORIGINAL, will be erased
   from the field.

TABLE 1

| | | | |
|---|---|---|---|
| 406 | FIELD MARK COORDINATES X1 Y1 X2 Y2 | | OPTIONAL |
| 406 | FIELD VIEWPOINT STRUCTURE | | X3 Y3 |
| | | COORD. CORNER | X4 Y4 |
| | TYPE | | |
| | REGION 1 - BOX END1 | X11, Y11 | |
| | REGION 2 - BLOB | CIRCUMSCRIBING BOX COORD. (X21; Y21) (X22; Y22) | |
| | BIT MAP IMAGE OF BLOB | | |
| | LINE | (X23; Y23) (224; Y24) COORD. CORNER | |
| | REGION 3 - BOX END2 | (X31; Y31) | |
| | REGION 4 - LINE | (X41; Y41) (X42; Y42) | |
| | REGION 5 - BOX END3 | (X41; Y51) | |
| | REGION 6 - LINE | (X61; Y61) (X62; Y62) | |
| | REGION 7 - BOX END4 | (X71; Y71) | |
| | REGION 8 - LINE | (X81; Y81) (X82; Y82) | |
| | INSIDE REGION 9 - | | |
| | BOX END1 | (X9,1; Y9,1) | |
| | 2 | 9,2 | |
| | 3 | 9,3 | |
| | 4 | 9,4 | |
| | LINE | X95,1; Y13,1) (X96-Y13,2) | |
| | BOX END1 | 14 | |
| | 2 | 15 | |
| | 3 | 16 | |
| | 4 | (X1,1; Y1,1) | |

Although a specific embodiment of the invention has been disclosed, it will be understood by those having skill in the art that changes can be made to that specific embodiment without departing from the spirit and the scope of the invention.

What is claimed is:

1. In a data processing system, a method for field extraction of scanned images of document forms, comprising the steps of:

creating a form definition for each form, which includes a form definition data set;

marking each field which is to be subjected to field extraction, on a master form;

defining a field viewpoint structure for each field, including field viewpoint primitive shapes including line ends, box ends, crossed lines, and blobs;

breaking the area within and surrounding a marked field into regions, an inner region enclosed by the marked field and eight outer regions which surround the marked field;

identifying types and locations of viewpoint primitives in each region;

linking the defined primitive into a view relation;

defining a field viewpoint structure as a set of all the viewpoint primitives and the view relation for a field;

storing the coordinates of the field mark and the field viewpoint structure for each field;

defining a collection of coordinates and field viewpoint structures for all fields on a form as a form definition data set for the form;

storing the form definition data set in the system until a particular filled in copy of the form is scanned into the system.

2. The method of claim 1 which further comprises the steps of:

scanning into the system a copy of a filled in form;

performing forms recognition to identify a form ID for the scanned-in form, which determines skew and offset of the scanned-in form;

using the form ID to access the form definition data set;

examining every field on the scanned-in form;

adjusting coordinates where each field is expected, by using the offset values for the scanned-in form;

comparing the stored viewpoint structure for a field in the data set, with the viewpoint structure of the field for the scanned-in form;

for each inner and surrounding region of a field, determining if there are any viewpoint primitives in the data set;

comparing viewpoint primitives in the data set with any viewpoint primitives in the corresponding region on the scanned-in form;

removing all matching viewpoint primitives from the scanned-in form image;

extracting field images from the fields after said removal step, and outputting the extracted field images to a character recognition process.

* * * * *